(12) United States Patent
Gholmieh et al.

(10) Patent No.: US 9,712,981 B2
(45) Date of Patent: Jul. 18, 2017

(54) CLIENT ID AND MULTI-APPLICATION SUPPORT FOR RECEPTION REPORTING

(71) Applicant: QUALCOMM Incorporated, San Diego, CA (US)

(72) Inventors: Ralph Akram Gholmieh, San Diego, CA (US); Nagaraju Naik, San Diego, CA (US); Carlos Marcelo Dias Pazos, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 14/660,891

(22) Filed: Mar. 17, 2015

(65) Prior Publication Data
US 2015/0281913 A1    Oct. 1, 2015

Related U.S. Application Data

(60) Provisional application No. 61/970,343, filed on Mar. 25, 2014.

(51) Int. Cl.
*H04W 4/06* (2009.01)
*H04L 1/16* (2006.01)
(Continued)

(52) U.S. Cl.
CPC ............. *H04W 4/06* (2013.01); *H04L 1/1621* (2013.01); *H04L 65/4076* (2013.01); *H04W 72/005* (2013.01); *H04W 88/04* (2013.01)

(58) Field of Classification Search
CPC ..... H04W 72/00; H04W 72/005; H04W 4/06; H04W 4/1621; H04L 61/2061
See application file for complete search history.

(56) References Cited

U.S. PATENT DOCUMENTS

2002/0006120 A1* 1/2002 Suzuki ................. G07B 15/063
370/329

2004/0004968 A1* 1/2004 Nassar .............. H04L 29/12481
370/401

(Continued)

FOREIGN PATENT DOCUMENTS

| CN | 101110722 A | 1/2008 |
| WO | 2013138020 A1 | 9/2013 |

OTHER PUBLICATIONS

3GPP: "3rd Generation Partnership Project; Technical Specification Group Services and System Aspects; Multimedia Broadcast/Multicast Service (MBMS); Protocols and codecs (Release 10)",Dec. 20, 2012 (Dec. 20, 2012), pp. 1-156, XP055248543, Retrieved from the Internet: URL:http://www.3gpp.org/DynaReport/26346.htm (retrieved on Feb. 9, 2016].
Anonymous: "Port (computer networking)—Wikipedia, the free encyclopedia", Feb. 15, 2013 (Feb. 15, 2013), XP055248688, Retrieved from the Internet: URL:https://en.wikipedia.org/w/index.pIIp?title=Port_(computer_networking) &oldid=538456366 [retrieved on 20 Feb. 9, 2016].

(Continued)

*Primary Examiner* — Warner Wong
(74) *Attorney, Agent, or Firm* — Arent Fox LLP

(57) ABSTRACT

A first UE receives a request for a service from an application running on a second UE or an application running on the first UE. The second UE is different than the first UE. The request for the service is a request for a set of files/streams through an MBMS service. The first UE attempts to receive the set of files/streams through the MBMS service from one of a base station or a third UE. The first UE sends a reception report including at least one of a reception acknowledgement or a statistical report associated with the set of files/streams. The at least one of the reception acknowledgement or the statistical report associated with the set of files/streams includes an identifier associated with at least one of the second UE, the third UE, the application running on the second UE, or the application running on the first UE.

30 Claims, 32 Drawing Sheets

(51) Int. Cl.
*H04W 72/00* (2009.01)
*H04L 29/06* (2006.01)
*H04W 88/04* (2009.01)

(56) References Cited

U.S. PATENT DOCUMENTS

| | | |
|---|---|---|
| 2012/0026929 A1 | 2/2012 | Wang et al. |
| 2013/0070660 A1 | 3/2013 | Xu |
| 2013/0128756 A1 | 5/2013 | Zhang et al. |
| 2013/0182628 A1 | 7/2013 | Gholmieh et al. |
| 2013/0215817 A1 | 8/2013 | Lu et al. |
| 2013/0267202 A1 | 10/2013 | Palanigounder et al. |
| 2013/0273907 A1* | 10/2013 | Vikberg ............ H04W 48/02 455/426.1 |
| 2014/0192701 A1 | 7/2014 | Drevö |
| 2014/0269335 A1 | 9/2014 | Gupta et al. |
| 2014/0341188 A1 | 11/2014 | Chang et al. |
| 2015/0270979 A1* | 9/2015 | Andrada ............ H04L 51/38 370/390 |
| 2015/0334561 A1* | 11/2015 | Chen ............ H04L 63/062 370/329 |

OTHER PUBLICATIONS

3GPP TS 26.346: "3rd Generation Partnership Project; Technical Specification Group Services and System Aspects; Multimedia Broadcast/Multicast Service; Protocols and Codecs," Version 1.1.0, Release 6, Nov. 2004, pp. 61.

"3rd Generation Partnership Project; Technical Specification Group Services and System Aspects; Multimedia Broadcast/Multicast Service (MBMS), Architecture and functional description (Release 11)", 3GPP Standard; 3GPP TS 23.246, 3rd Generation Partnership Project (3GPP), Mobile Competence Centre, 650, Route Des Lucioles; F-06921 Sophia-Antipolis Cedex, France, vol. SA WG2, No. V11.1.0, Mar. 8, 2012, pp. 1-66.

3rd Generation Partnership Project: Technical Specification Group Services and System Aspects; Multimedia Broadcast/Multicast Service (MBMS); Protocols and codecs, Release 12,3 GPP TS 26.346 V12.1.0, Mar. 2014, XP050769694,181 pp.

International Search Report and Written Opinion—PCT/US2015/021295—ISA/EPO—Jul. 8, 2015.

* cited by examiner

Report R1:
```
<?xml version="1.0" encoding="UTF-8"?>
<receptionReport xmlns="urn:3gpp:metadata:2008:MBMS:receptionreport"
 xmlns:xsi="http://www.w3.org/2001/XMLSchema-instance"
 xsi:schemaLocation="urn:3gpp:metadata:2008:MBMS:receptionreport receptionreport.xsd">
 <receptionAcknowledgement >
  <fileURI clientId="X@MDN" >http://www.example.com/mbms-files/file1.3gp</fileURI>
  <fileURI clientId="X@MDN" >http://www.example.com/mbms-files/file2.3gp</fileURI>
  <fileURI clientId="X@MDN" >http://www.example.com/mbms-files/file3.3gp</fileURI>
 </receptionAcknowledgement>
</receptionReport>
```

Report R2:
```
<?xml version="1.0" encoding="UTF-8"?>
<receptionReport xmlns="urn:3gpp:metadata:2008:MBMS:receptionreport"
 xmlns:xsi="http://www.w3.org/2001/XMLSchema-instance"
 xsi:schemaLocation="urn:3gpp:metadata:2008:MBMS:receptionreport receptionreport.xsd">
 <receptionAcknowledgement >
  <fileURI clientId="Y@MDN" >http://www.example.com/mbms-files/file1.3gp</fileURI>
  <fileURI clientId="Y@MDN" >http://www.example.com/mbms-files/file3.3gp</fileURI>
 </receptionAcknowledgement>
</receptionReport>
```

Report R3:
```
<?xml version="1.0" encoding="UTF-8"?>
<receptionReport xmlns="urn:3gpp:metadata:2008:MBMS:receptionreport"
 xmlns:xsi="http://www.w3.org/2001/XMLSchema-instance"
 xsi:schemaLocation="urn:3gpp:metadata:2008:MBMS:receptionreport receptionreport.xsd">
 <receptionAcknowledgement >
  <fileURI clientId="Z@MDN" >http://www.example.com/mbms-files/file1.3gp</fileURI>
 </receptionAcknowledgement>
</receptionReport>
```

FIG. 11

Report:

```
<?xml version="1.0" encoding="UTF-8"?>
<receptionReport xmlns="urn:3gpp:metadata:2008:MBMS:receptionreport"
    xmlns:xsi="http://www.w3.org/2001/XMLSchema-instance"
    xsi:schemaLocation="urn:3gpp:metadata:2008:MBMS:receptionreport receptionreport.xsd">
<receptionAcknowledgement >
    <fileURI clientId="X@MDN" >http://www.example.com/mbms-files/file1.3gp</fileURI>
    <fileURI clientId="X@MDN" >http://www.example.com/mbms-files/file2.3gp</fileURI>
    <fileURI clientId="X@MDN" >http://www.example.com/mbms-files/file3.3gp</fileURI>
    <fileURI clientId="Y@MDN" >http://www.example.com/mbms-files/file1.3gp</fileURI>
    <fileURI clientId="Y@MDN" >http://www.example.com/mbms-files/file3.3gp</fileURI>
    <fileURI clientId="Z@MDN" >http://www.example.com/mbms-files/file1.3gp</fileURI>
</receptionAcknowledgement>
</receptionReport>
```

Report R1:
```
<?xml version="1.0" encoding="UTF-8"?>
<receptionReport xmlns="urn:3gpp:metadata:2008:MBMS:receptionreport"
    xmlns:xsi="http://www.w3.org/2001/XMLSchema-instance"
    xsi:schemaLocation="urn:3gpp:metadata:2008:MBMS:receptionreport receptionreport.xsd">
    <statisticalReport clientId="X(@MDN" serviceId="serviceID">
        <qoeMetrics
            sessionStartTime="tx1"
            sessionStopTime="tx2">
            networkResourceCellId= "240012AF134EA = ="
            numberOfLostObjects = "0 1 2 3"
            numberOfReceivedObjects = "60 59 58 57"
        </qoeMetrics>
    </statisticalReport>
</receptionReport>
```

Report R2:
```
<?xml version="1.0" encoding="UTF-8"?>
<receptionReport xmlns="urn:3gpp:metadata:2008:MBMS:receptionreport"
    xmlns:xsi="http://www.w3.org/2001/XMLSchema-instance"
    xsi:schemaLocation="urn:3gpp:metadata:2008:MBMS:receptionreport receptionreport.xsd">
    <statisticalReport clientId="Y(@MDN" serviceId="serviceID">
        <qoeMetrics
            sessionStartTime="ty1"
            sessionStopTime="ty2">
            networkResourceCellId= "240012AF134EA = ="
            numberOfLostObjects = "2 3 4 5"
            numberOfReceivedObjects = "58 57 56 55"
        </qoeMetrics>
    </statisticalReport>
</receptionReport>
```

1400

Report R3:
```
<?xml version="1.0" encoding="UTF-8"?>
<receptionReport xmlns="urn:3gpp:metadata:2008:MBMS:receptionreport"
    xmlns:xsi="http://www.w3.org/2001/XMLSchema-instance"
    xsi:schemaLocation="urn:3gpp:metadata:2008:MBMS:receptionreport receptionreport.xsd">
<statisticalReport clientId="Y@MDN" serviceId="serviceID">
    <qoeMetrics
        sessionStartTime="tz1"
        sessionStopTime="tz2">
        networkResourceCellId= "24001 2AF134EA = = 24001 2AF134EB"
        numberOfLostObjects = "5 6 7 8"
        numberOfReceivedObjects = "55 54 53 52"
    </qoeMetrics>
</statisticalReport>
</receptionReport>
```

FIG. 15

Report:
```xml
<?xml version="1.0" encoding="UTF-8"?>
<receptionReport xmlns="urn:3gpp:metadata:2008:MBMS:receptionreport"
    xmlns:xsi="http://www.w3.org/2001/XMLSchema-instance"
    xsi:schemaLocation="urn:3gpp:metadata:2008:MBMS:receptionreport receptionreport.xsd">
    <statisticalReport clientId="X@MDN" serviceId="serviceID">
        <qoeMetrics
            sessionStartTime="tx1"
            sessionStopTime="tx2">
            networkResourceCellId= "24001 2AF134EA = =:"
            numberOfLostObjects = "0 1 2 3"
            numberOfReceivedObjects = "60 59 58 57"
        </qoeMetrics>
    </statisticalReport>
    <statisticalReport clientId="Y@MDN" serviceId="serviceID">
        <qoeMetrics
            sessionStartTime="ty1"
            sessionStopTime="ty2">
            networkResourceCellId= "24001 2AF134EA = ="
            numberOfLostObjects = "2 3 4 5"
            numberOfReceivedObjects = "58 57 56 55"
        </qoeMetrics>
    </statisticalReport>
    <statisticalReport clientId="Y@MDN" serviceId="serviceID">
        <qoeMetrics
            sessionStartTime="tz1"
            sessionStopTime="tz2">
            networkResourceCellId= "24001 2AF134EA = = 24001 2AF134EB"
            numberOfLostObjects = "5 6 7 8"
            numberOfReceivedObjects = "55 54 53 52"
        </qoeMetrics>
    </statisticalReport>
</receptionReport>
```

FIG. 16

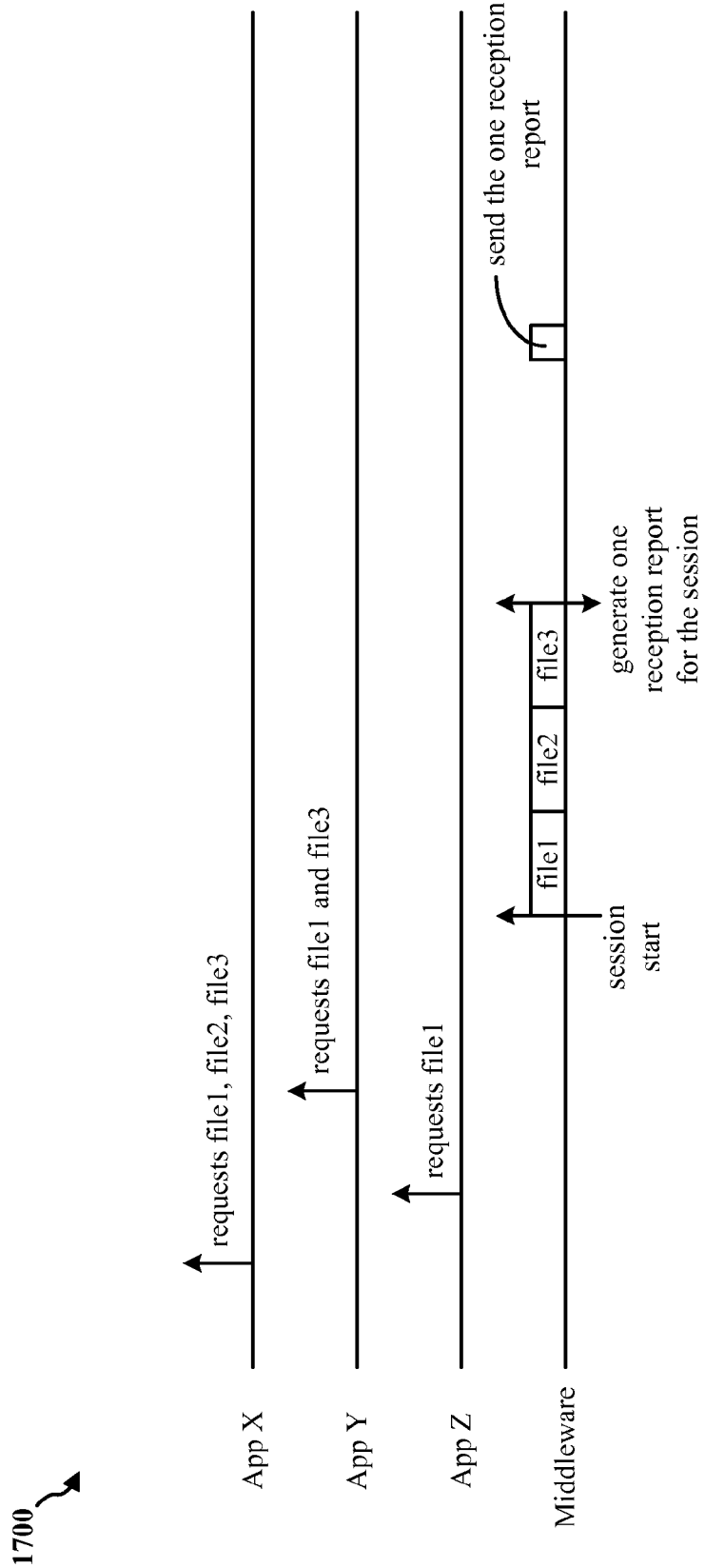

Report:
```
<?xml version="1.0" encoding="UTF-8"?>
<receptionReport xmlns="urn:3gpp:metadata:2008:MBMS:receptionreport"
    xmlns:xsi="http://www.w3.org/2001/XMLSchema-instance"
    xsi:schemaLocation="urn:3gpp:metadata:2008:MBMS:receptionreport receptionreport.xsd">
    <receptionAcknowledgement >
        <fileURI clientId="X@Y@Z@MDN" >http://www.example.com/mbms-files/file1.3gp</fileURI>
        <fileURI clientId="X@MDN" >http://www.example.com/mbms-files/file2.3gp</fileURI>
        <fileURI clientId="X@Y@MDN" >http://www.example.com/mbms-files/file3.3gp</fileURI>
    </receptionAcknowledgement>
</receptionReport>
```

FIG. 18

Report R1:
```
<?xml version="1.0" encoding="UTF-8"?>
<receptionReport xmlns="urn:3gpp:metadata:2008:MBMS:receptionreport"
    xmlns:xsi="http://www.w3.org/2001/XMLSchema-instance"
    xsi:schemaLocation="urn:3gpp:metadata:2008:MBMS:receptionreport receptionreport.xsd">
  <statisticalReport clientId="X@MDN" serviceId="serviceID">
    <qoeMetrics
        sessionStartTime="tx1"
        sessionStopTime="ty1">
      networkResourceCellId="240012AF134EA ="
      numberOfLostObjects = "0 1"
      numberOfReceivedObjects = "60 59"
    </qoeMetrics>
  </statisticalReport>
</receptionReport>
```

Report R2:
```
<?xml version="1.0" encoding="UTF-8"?>
<receptionReport xmlns="urn:3gpp:metadata:2008:MBMS:receptionreport"
    xmlns:xsi="http://www.w3.org/2001/XMLSchema-instance"
    xsi:schemaLocation="urn:3gpp:metadata:2008:MBMS:receptionreport receptionreport.xsd">
  <statisticalReport clientId="X@Y@MDN" serviceId="serviceID">
    <qoeMetrics
        sessionStartTime="ty1"
        sessionStopTime="tx2">
      networkResourceCellId="240012AF134EA ="
      numberOfLostObjects = "2 3"
      numberOfReceivedObjects = "58 57"
    </qoeMetrics>
  </statisticalReport>
</receptionReport>
```

Report R3:
```
<?xml version="1.0" encoding="UTF-8"?>
<receptionReport xmlns="urn:3gpp:metadata:2008:MBMS:receptionreport"
    xmlns:xsi="http://www.w3.org/2001/XMLSchema-instance"
    xsi:schemaLocation="urn:3gpp:metadata:2008:MBMS:receptionreport receptionreport.xsd">
<statisticalReport clientId="Y@MDN" serviceId="serviceID">
    <qoeMetrics>
        sessionStartTime="tx2"
        sessionStopTime="tz1"/>
        networkResourceCellId="240012AF134EA"
        numberOfLostObjects = "4"
        numberOfReceivedObjects = "56"

</qoeMetrics>
</statisticalReport>
</receptionReport>
```

Report R4:
```
<?xml version="1.0" encoding="UTF-8"?>
<receptionReport xmlns="urn:3gpp:metadata:2008:MBMS:receptionreport"
    xmlns:xsi="http://www.w3.org/2001/XMLSchema-instance"
    xsi:schemaLocation="urn:3gpp:metadata:2008:MBMS:receptionreport receptionreport.xsd">
<statisticalReport clientId="Y@Z@MDN" serviceId="serviceID">
    <qoeMetrics>
        sessionStartTime="tz1"
        sessionStopTime="ty2"/>
        networkResourceCellId="240012AF134EA = = 240012AF134EB"
        numberOfLostObjects = "5"
        numberOfReceivedObjects = "55"

</qoeMetrics>
</statisticalReport>
</receptionReport>
```

2100

Report R5:
```
<?xml version="1.0" encoding="UTF-8"?>
<receptionReport xmlns="urn:3gpp:metadata:2008:MBMS:receptionreport"
    xmlns:xsi="http://www.w3.org/2001/XMLSchema-instance"
    xsi:schemaLocation="urn:3gpp:metadata:2008:MBMS:receptionreport receptionreport.xsd">
<statisticalReport clientId="Z@MDN" serviceId="serviceID">
    <qoeMetrics
        sessionStartTime="ty2"
        sessionStopTime="tz2"/>
    networkResourceCellId= "24001 2AF134EA = 24001 2AF134EB"
    numberOfLostObjects = "6 7 8 "
    numberOfReceivedObjects = "54 53 52"
    </qoeMetrics>
</statisticalReport>
</receptionReport>
```

Report:

```
<?xml version="1.0" encoding="UTF-8"?>
<receptionReport xmlns="urn:3gpp:metadata:2008:MBMS:receptionreport"
    xmlns:xsi="http://www.w3.org/2001/XMLSchema-instance"
    xsi:schemaLocation="urn:3gpp:metadata:2008:MBMS:receptionreport receptionreport.xsd">
    <statisticalReport clientId="X@MDN" serviceId="serviceID">
        <qoeMetrics
            sessionStartTime="tx1"
            sessionStopTime="ty1"/>
            networkResourceCellId = "240012AF134EA ="
            numberOfLostObjects = "0 1"
            numberOfReceivedObjects = "60 59"
        </qoeMetrics>
    </statisticalReport>
    <statisticalReport clientId="X@Y@MDN" serviceId="serviceID">
        <qoeMetrics
            sessionStartTime="ty1"
            sessionStopTime="tx2"/>
            networkResourceCellId = "240012AF134EA ="
            numberOfLostObjects = "2 3 "
            numberOfReceivedObjects = "58 57"
        </qoeMetrics>
    </statisticalReport>
    <statisticalReport clientId="Y@MDN" serviceId="serviceID">
        <qoeMetrics
            sessionStartTime="tx2"
            sessionStopTime="tz1"/>
            networkResourceCellId = "240012AF134EA"
            numberOfLostObjects = "4 "
            numberOfReceivedObjects = "56"
        </qoeMetrics>
    </statisticalReport>
```

```
<statisticalReport clientId="Y@Z@MDN" serviceId="serviceID">
    <qoeMetrics
        sessionStartTime="tz1"
        sessionStopTime="ty2">
        networkResourceCellId="24001 2AF134EA = = = = 24001 2AF134EB"
        numberOfLostObjects = "5"
        numberOfReceivedObjects = "55"
    </qoeMetrics>
</statisticalReport>
<statisticalReport clientId="Z@MDN" serviceId="serviceID">
    <qoeMetrics
        sessionStartTime="ty2"
        sessionStopTime="tz2">
        networkResourceCellId="24001 2AF134EA = 24001 2AF134EB"
        numberOfLostObjects = "6 7 8"
        numberOfReceivedObjects = "54 53 52"
    </qoeMetrics>
</statisticalReport>
</receptionReport>
```

2700

2508 A

2702 receive a request for a second set of files from a fourth UE or an application running on the fourth UE – the reception acknowledgement is further associated with the second set of files, the set of files is $S_1$ and the second set of files is $S_2$; for a set of files $S_1 \cap S_2$, the reception acknowledgment includes a subelement acknowledging reception of the files $S_1 \cap S_2$, an identifier associated with the first UE, and identifiers associated with at least one of both the second UE and the fourth UE or applications running on both the second UE and the fourth UE; for a set of files $S_1$ excluding the subset of files $S_1 \cap S_2$, the reception acknowledgment includes a subelement acknowledging reception of the files $S_1$ excluding the subset of files $S_1 \cap S_2$, an identifier associated with the first UE, and an identifier associated with at least one of the second UE or an application running on the second UE; and for a set of files $S_2$ excluding the subset of files $S_1 \cap S_2$, the reception acknowledgment includes a subelement acknowledging reception of the files $S_2$ excluding the subset of files $S_1 \cap S_2$, an identifier associated with the first UE, and an identifier associated with at least one of the fourth UE or an application running on the fourth UE.

FIG. 27

CLIENT ID AND MULTI-APPLICATION SUPPORT FOR RECEPTION REPORTING

CROSS-REFERENCE TO RELATED APPLICATION(S)

This application claims the benefit of U.S. Provisional Application Ser. No. 61/970,343, entitled "CLIENT ID AND MULTI-APPLICATION SUPPORT FOR RECEPTION REPORTING" and filed on Mar. 25, 2014, which is expressly incorporated by reference herein in its entirety.

BACKGROUND

Field

The present disclosure relates generally to communication systems, and more particularly, to reception reporting.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a first user equipment (UE). The first UE receives a request for a service from an application running on a second UE or an application running on the first UE. The second UE is different than the first UE. The request for the service is a request for a set of files or streams through a Multimedia Broadcast Multicast Service (MBMS) service. The first UE attempts to receive the set of files or streams through the MBMS service from one of a base station or a third UE. The first UE sends a reception report including at least one of a reception acknowledgement or a statistical report associated with the set of files or streams. The at least one of the reception acknowledgement or the statistical report associated with the set of files or streams includes an identifier associated with at least one of the second UE, the third UE, the application running on the second UE, or the application running on the first UE.

In an aspect of the disclosure, a method, a computer program product, and an apparatus are provided. The apparatus may be a UE. The UE receives a request for a service from a second UE or an application running on the second UE. The request for the service is a request for a set of files or streams through an MBMS service. The UE attempts to receive the set of files or streams through the MBMS service. The UE sends a reception report including at least one of a reception acknowledgement or a statistical report associated with the set of files or streams. The at least one of the reception acknowledgement or the statistical report associated with the set of files or streams includes an identifier associated with at least one of the second UE or the application running on the second UE.

In one configuration, the at least one of the reception acknowledgement or the statistical report associated with the set of files or streams includes an identifier associated with the UE. In one configuration, the identifier associated with the UE and the identifier associated with at least one of the second UE or the application running on the second UE are indicated in a client identifier attribute within the at least one of the reception acknowledgement or the statistical report. In one configuration, the identifier associated with the UE is indicated in a client identifier attribute within the at least one of the reception acknowledgement or the statistical report, and the identifier associated with at least one of the second UE or the application running on the second UE is indicated in a different attribute within the at least one of the reception acknowledgement or the statistical report. In one configuration, the UE and the second UE are a same UE, and the identifier is associated with the application running on the second UE. In one configuration, the set of files or streams includes a set of files, and the reception report includes the reception acknowledgement associated with the set of files. In one configuration, the UE receives a request for a second set of files from a third UE or an application running on the third UE. The UE attempts to receive the second set of files through the MBMS service. The UE sends a second reception report including a reception acknowledgement associated with the second set of the files. The reception acknowledgement associated with the second set of the files includes an identifier associated with the UE and an identifier associated with at least one of the third UE or the application running on the third UE. In one configuration, the reception report and the second reception report are aggregated into one report. In one configuration, the UE receives a request for a second set of files from a third UE or an application running on the third UE. The reception acknowledgement is further associated with the second set of files. The set of files is $S_1$ and the second set of files is $S_2$. For a set of files $S_1 \cap S_2$, the reception acknowledgment includes a subelement acknowledging reception of the files $S_1 \cap S_2$, an identifier associated with the UE, and identifiers associated with at least one of both the second UE and the third UE or applications running on both the second UE and the third UE. For a set of files $S_1$ excluding the subset of files $S_1 \cap S_2$, the reception acknowledgment includes a subelement acknowledging reception of the files $S_1$ excluding the subset of files $S_1 \cap S_2$, an identifier associated with the UE, and an identifier associated with at least one of the second UE or an application running on the second UE. For a set of files $S_2$ excluding the subset of files $S_1 \cap S_2$, the reception acknowledgment includes a subelement acknowledging reception of the files $S_2$ excluding the subset of files $S_1 \cap S_2$, an identifier associated with the UE, and an identifier associated with at least one of the third UE or an application running on the third UE. In one configuration, the set of files or streams includes a set of streams, and the reception report includes the statistical report associated with the set of the streams. In one configuration, the UE receives a request for the set of streams from a third UE or an application running on the third UE. The UE sends a second reception report including a second statistical report associated with the set of the streams. The second statistical report associated with the set of the streams includes an identifier associated with the UE and an identifier associated with at least one of the third UE or an application running on the third UE. In one configuration, the reception report and the second reception report are aggregated into one report. In one configuration, the UE receives a request for the set of streams from a third UE or an application running on the third UE. The set of streams is requested by the second UE for reception during time duration $T_1$ and the set of streams is requested by the third UE for reception during time duration $T_2$. The UE sends additional reception reports associated with the set of streams. The reception report and the additional reception reports include a first reception report including a statistical report associated with the set of streams received during the time duration $T_1 \cap T_2$. The statistical report associated with the set of streams received during the time duration $T_1 \cap T_2$ include an identifier associated with the UE, and identifiers associated with at least one of both the second UE and the third UE or applications running on both the second UE and the third UE. The reception report and the additional reception reports further include a second reception report including a statistical report associated with the set of streams received during the time duration $T_1$ excluding the time duration $T_1 \cap T_2$. The statistical report associated with the set of streams received during the time duration $T_1$ excluding the time duration $T_1 \cap T_2$ include an identifier associated with the UE, and an identifier associated with at least one of the second UE or applications running on the second UE. The reception report and the additional reception reports further include a third reception report including a statistical report associated with the set of streams received during the time duration $T_2$ excluding the time duration $T_1 \cap T_2$. The statistical report associated with the set of streams received during the time duration $T_2$ excluding the time duration $T_1 \cap T_2$ include an identifier associated with the UE, and an identifier associated with at least one of the third UE or applications running on the third UE.

BRIEF DESCRIPTION OF THE DRAWINGS

FIG. 11 is a diagram illustrating an example of reception reports sent for file delivery services when parallel reporting without aggregation across applications.

FIG. 12 is a diagram illustrating an example of a reception report sent for file delivery services when parallel reporting with aggregation across applications.

FIG. 14 is a first diagram illustrating an example of reception reports sent for streaming services when parallel reporting without aggregation across applications.

FIG. 15 is a second diagram illustrating an example of reception reports sent for streaming services when parallel reporting without aggregation across applications.

FIG. 16 is a diagram illustrating an example of a reception report sent for streaming services when parallel reporting with aggregation across applications.

FIG. 17 is a diagram illustrating an example of linear reporting (per application) with aggregation across applications for file delivery services.

FIG. 18 is a diagram illustrating an example of a reception report sent for file delivery services when linear reporting with aggregation across applications.

FIG. 20 is a first diagram illustrating an example of reception reports sent for streaming services when linear reporting without aggregation across applications.

FIG. 21 is a second diagram illustrating an example of reception reports sent for streaming services when linear reporting without aggregation across applications.

FIG. 22 is a third diagram illustrating an example of reception reports sent for streaming services when linear reporting without aggregation across applications.

FIG. 23 is a first diagram illustrating an example of a reception report sent for streaming services when linear reporting with aggregation across applications.

FIG. 24 is a second diagram illustrating an example of a reception report sent for streaming services when linear reporting with aggregation across applications.

FIG. 27 is a flow chart of a third method of wireless communication.

DETAILED DESCRIPTION

Figure 1:
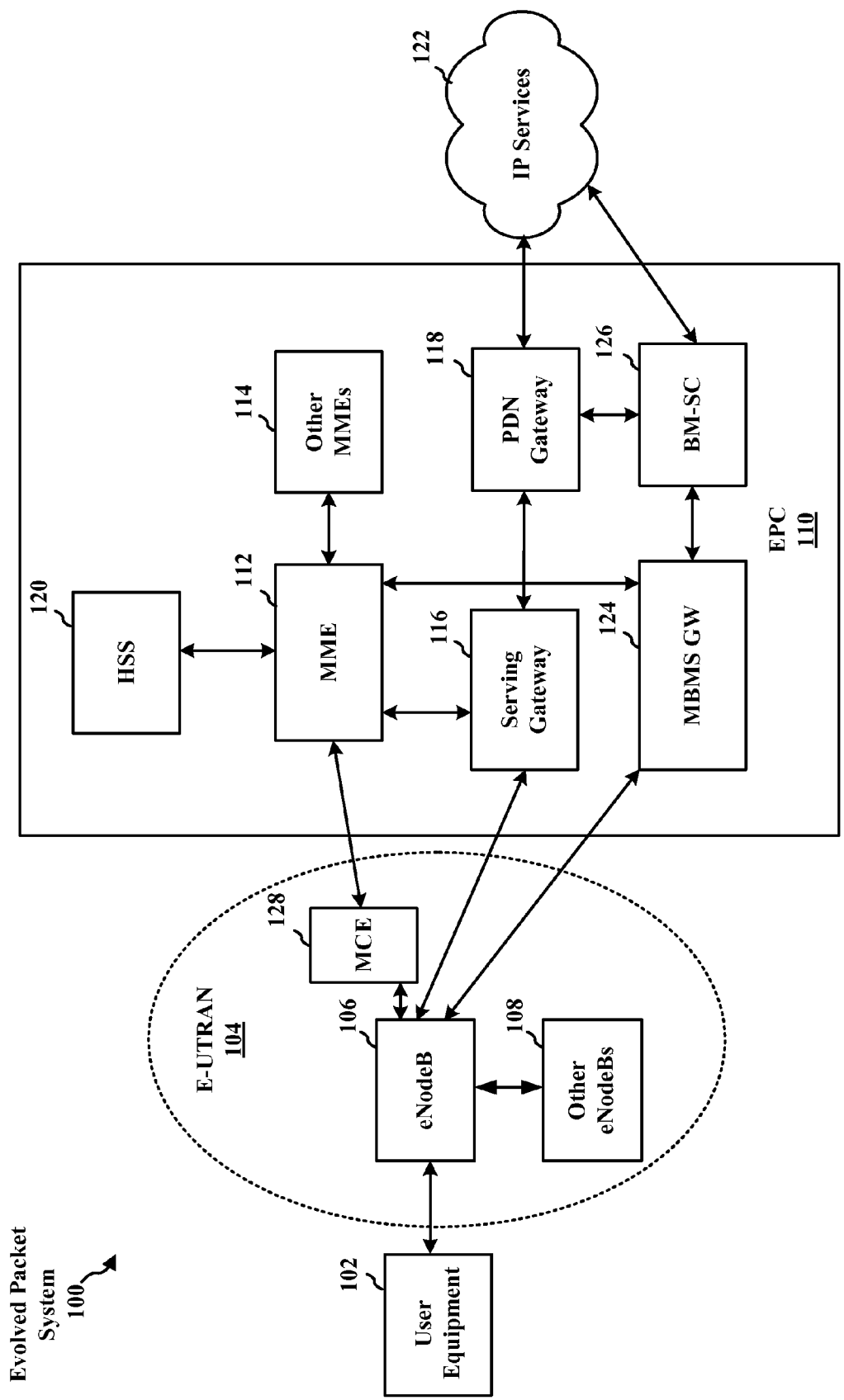
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
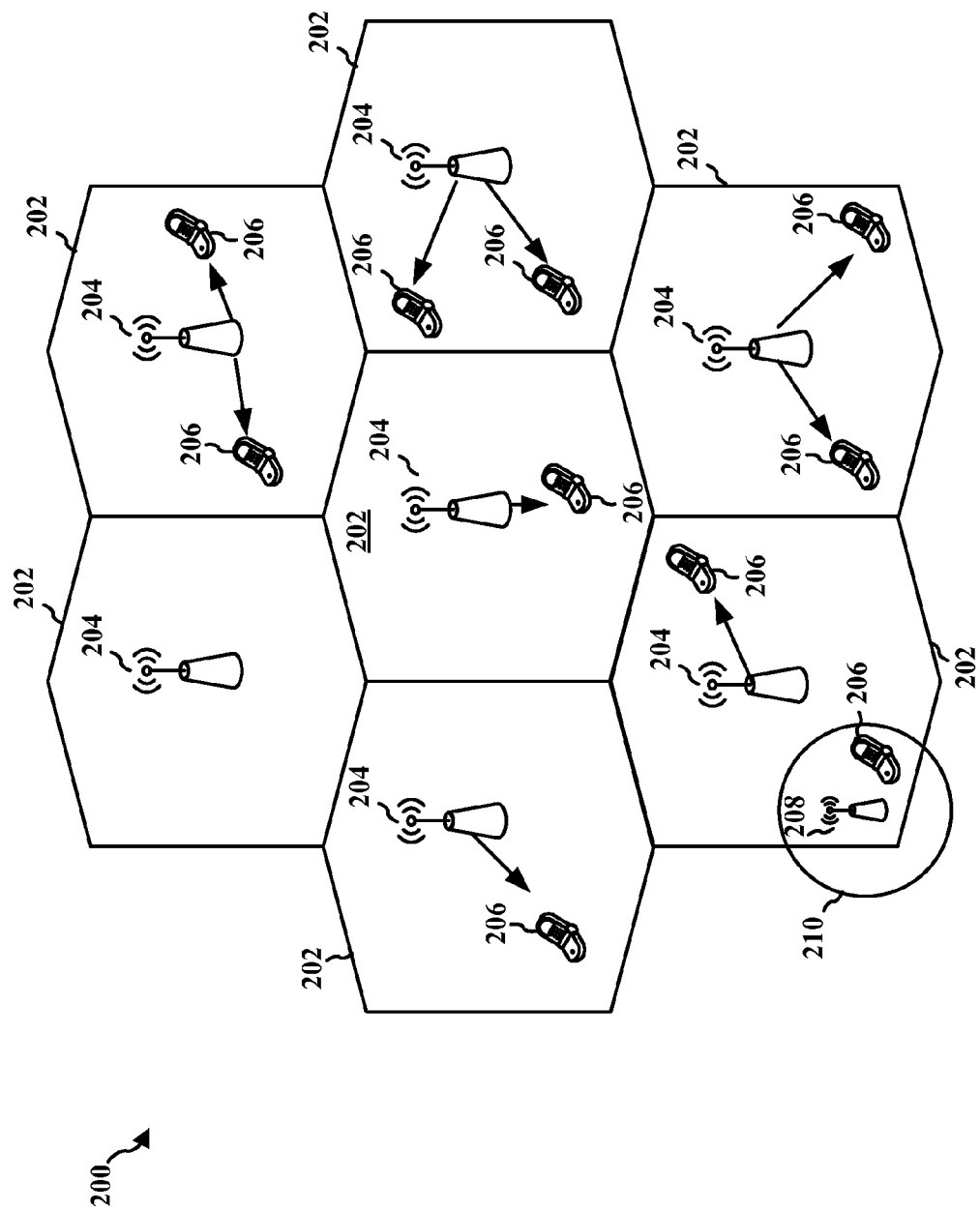
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
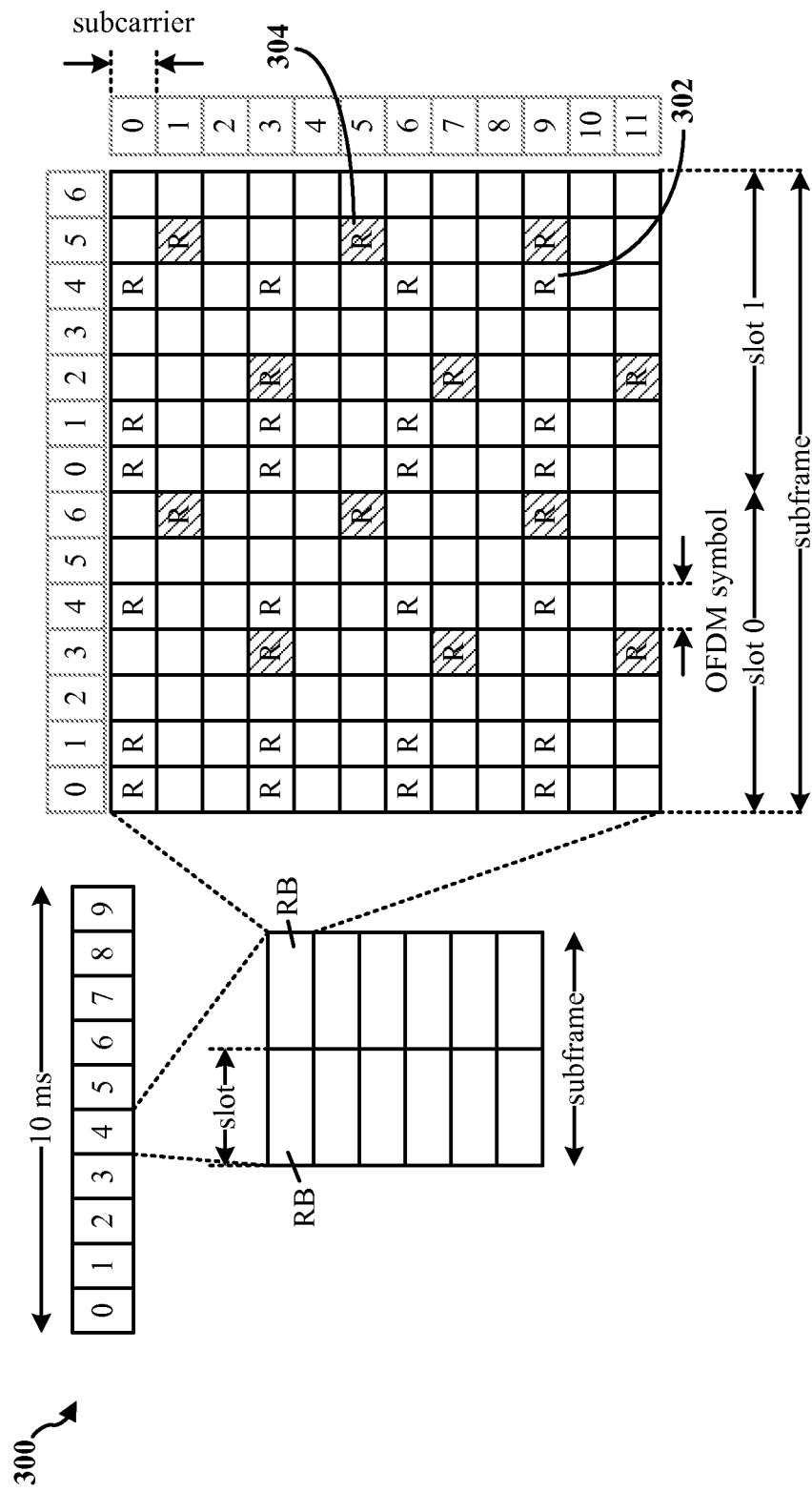
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
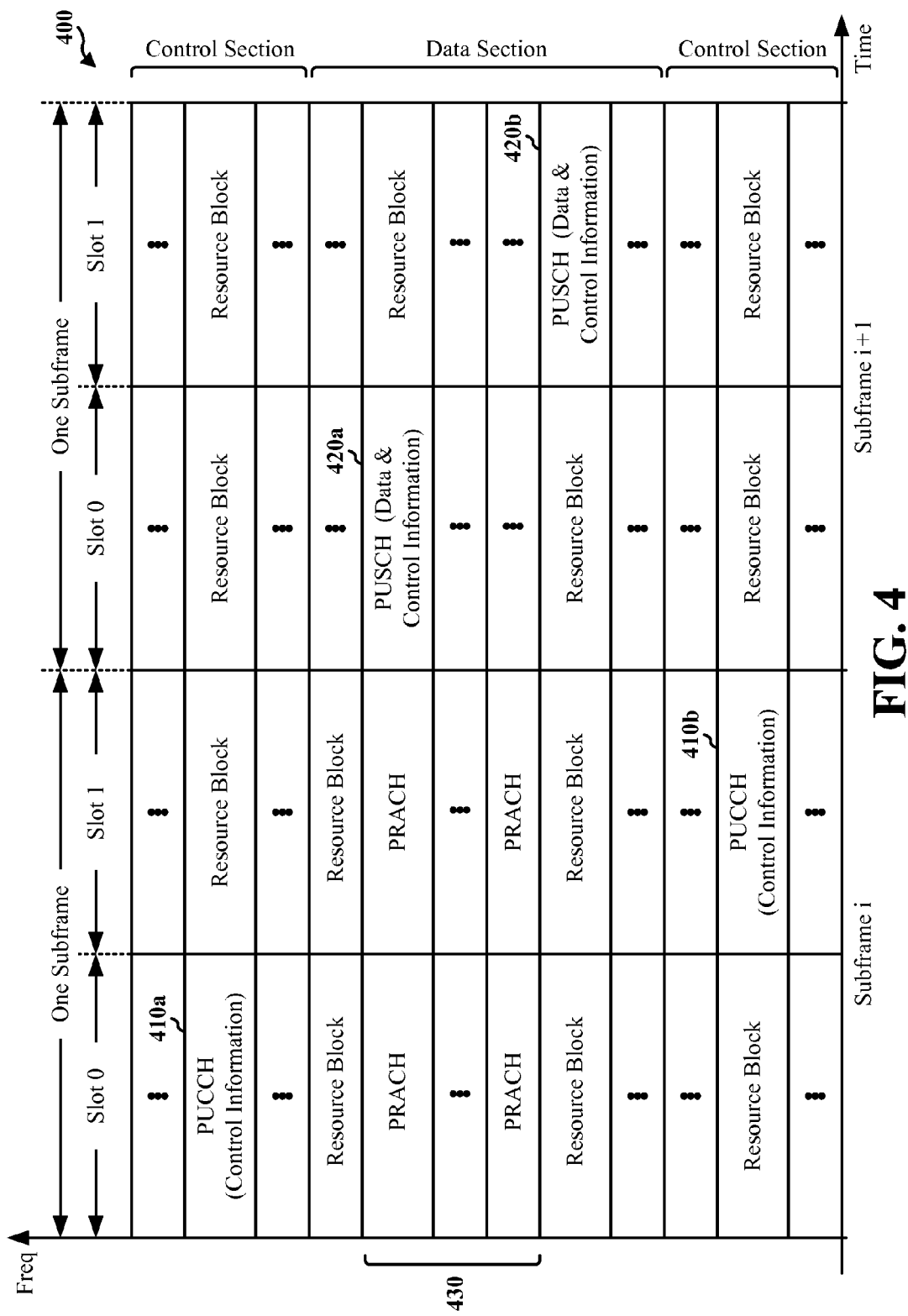
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
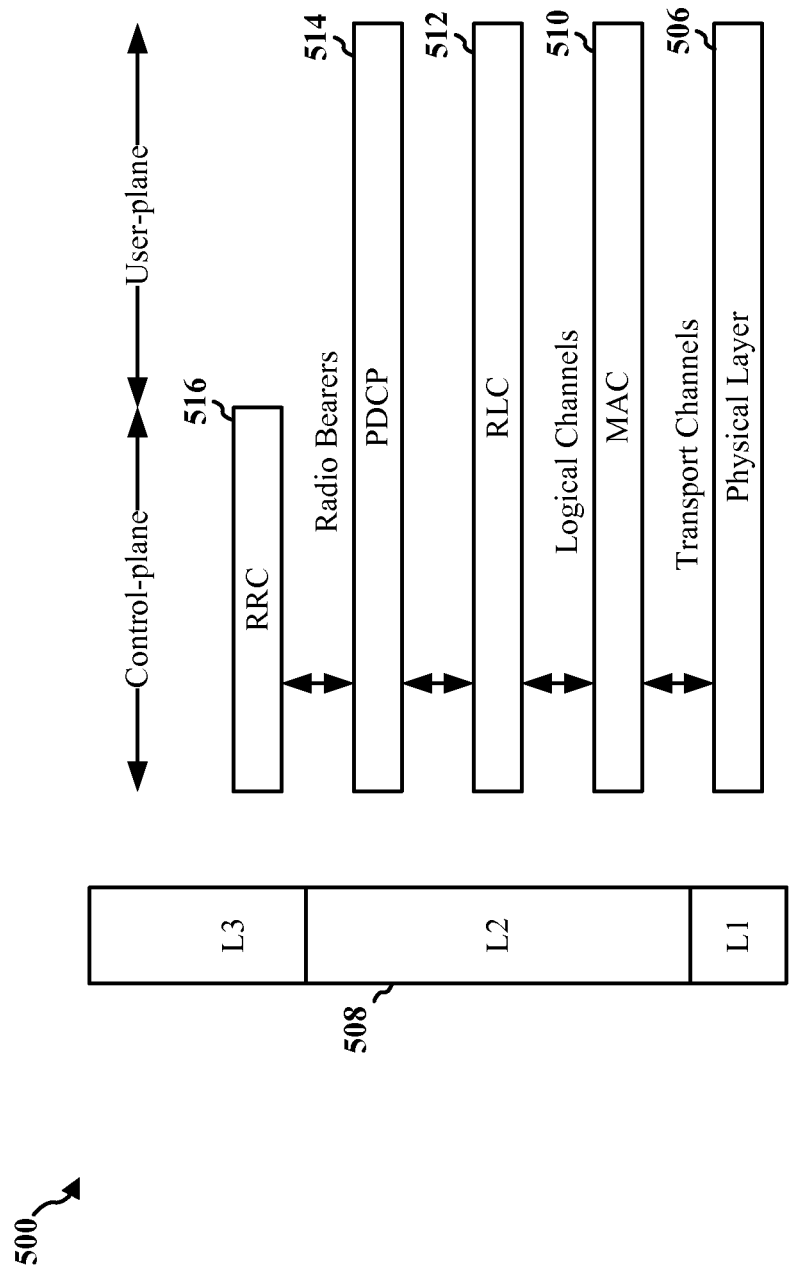
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
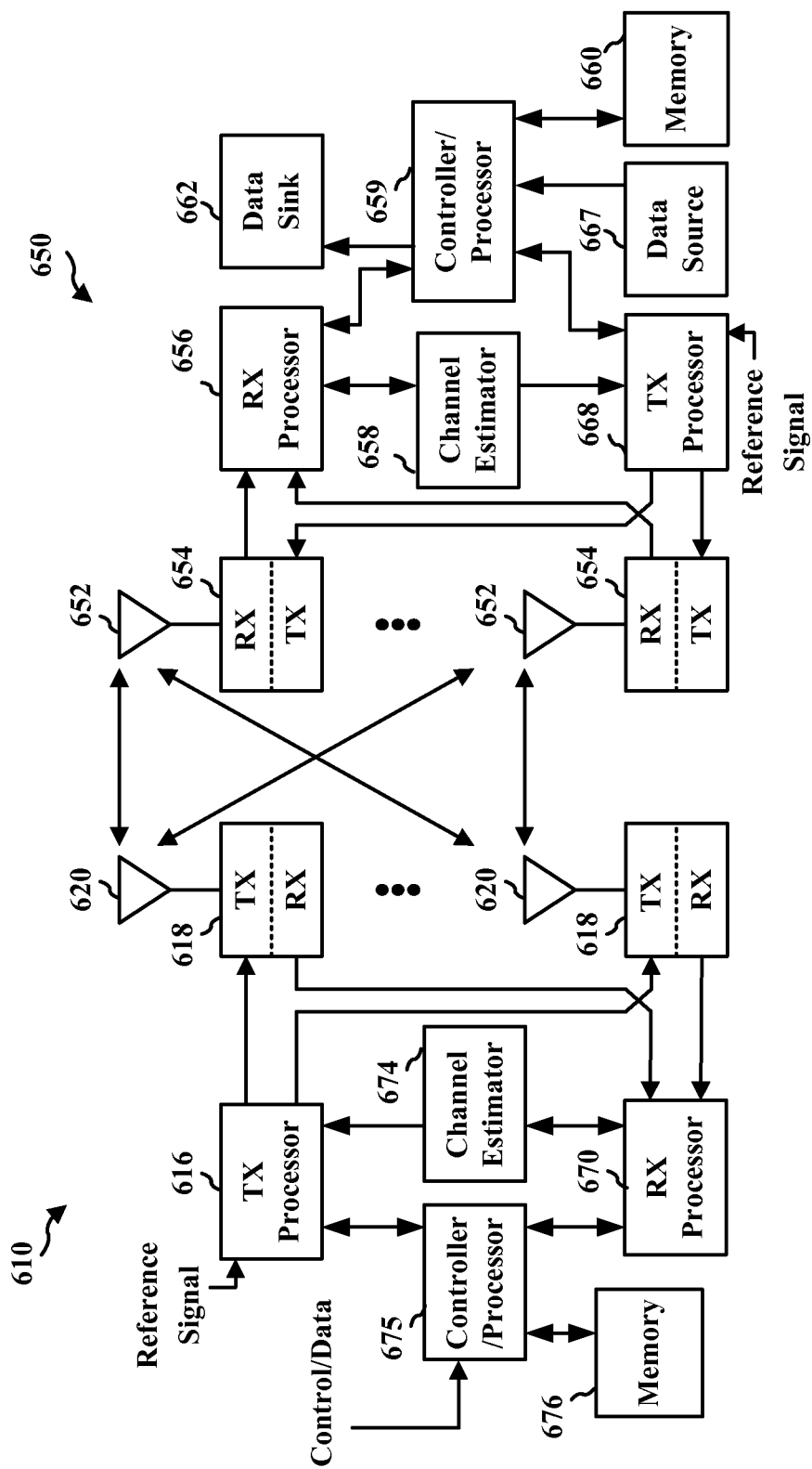
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
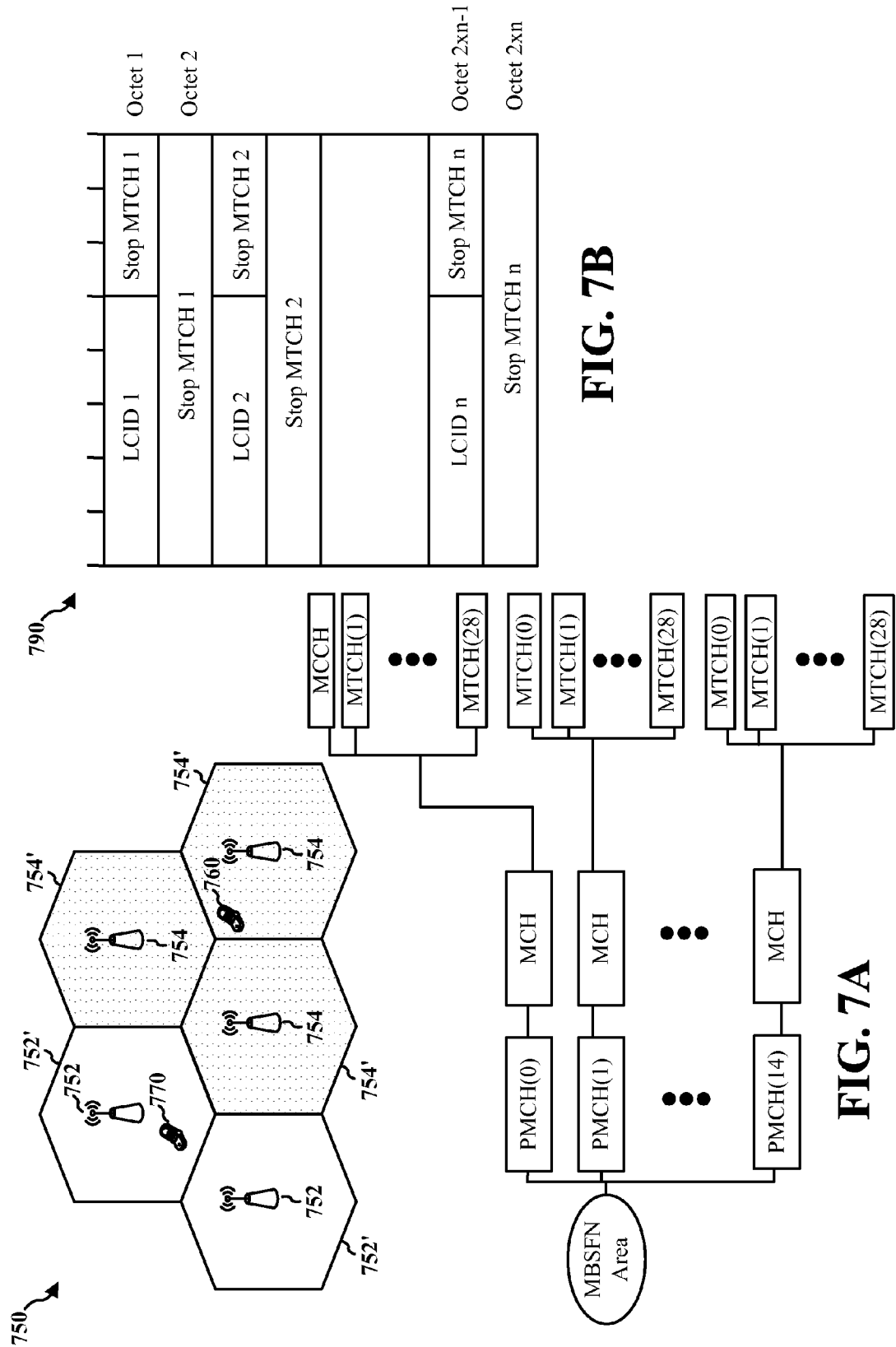
FIG. 7A is a diagram illustrating an example of an evolved Multimedia Broadcast Multicast Service (eMBMS) channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 may indicate (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Figure 8:
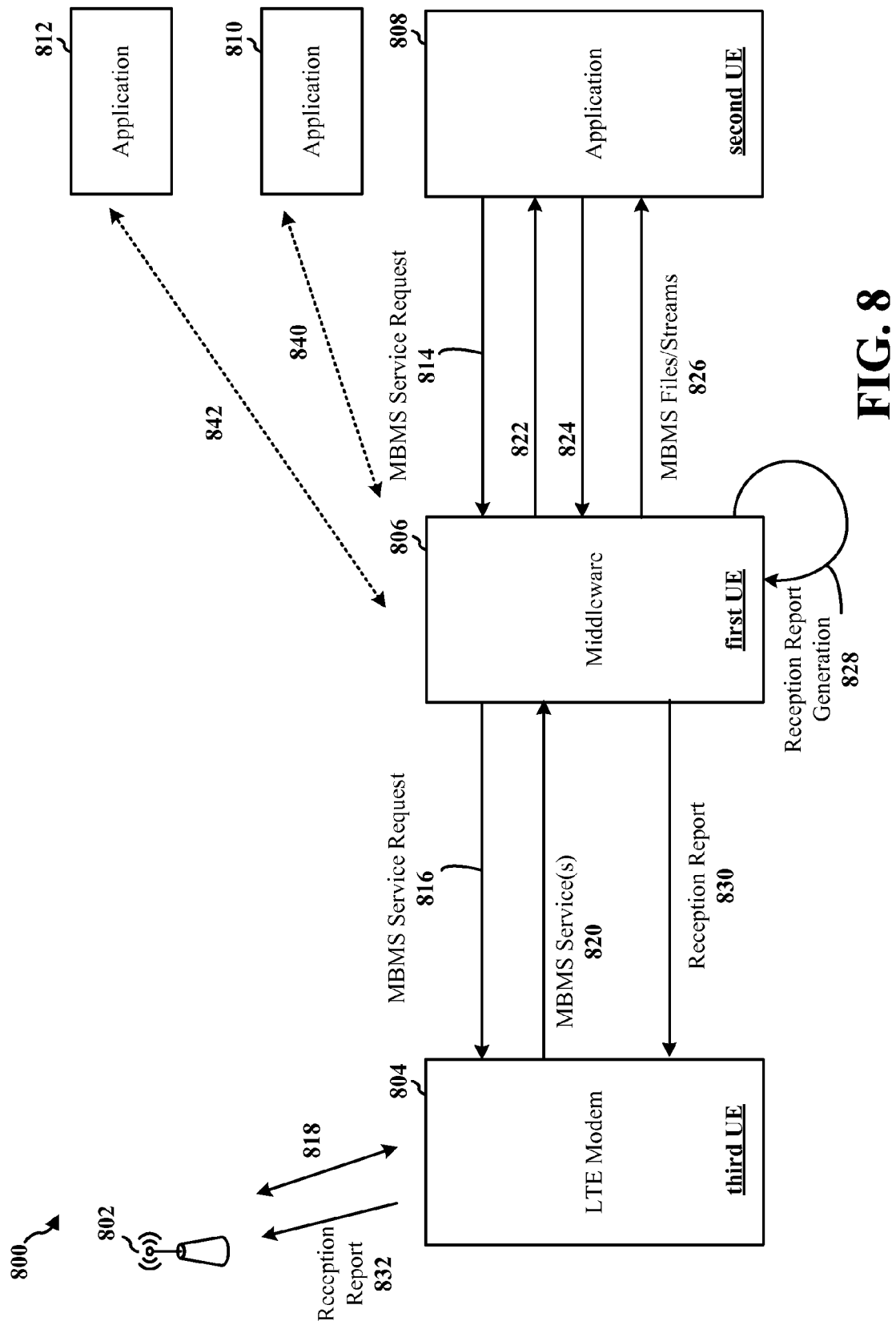
FIG. 8 is a diagram illustrating an exemplary eMBMS end-to-end architecture.

FIG. 8 is a diagram 800 illustrating an exemplary eMBMS end-to-end architecture. As shown in FIG. 8, a middleware client 806 running on a first UE may receive a request 814 for an MBMS service from an application 808 running on a second UE. The middleware client 806 may also receive additional requests 840, 842 for MBMS services from applications 810, 812 running on other UEs. The middleware client 806 may send an MBMS service request 816 to an LTE modem 804 of a third UE based on the received MBMS service requests 814, 840, 842. Specifically, in the MBMS service request 816, the middleware client 806 may request the same MBMS services that were requested in the MBMS service requests 814, 840, 842. The LTE modem 804 communicates 818 with the base station 802 to obtain the particular MBMS services, and then forwards 820 the received MBMS service(s) to the middleware client 806. The middleware client 806 informs 822 (e.g., through a short message service (SMS) text message) the application 808/second UE that MBMS services corresponding to the MBMS service request 814 have been received. The middleware client 806 may also inform the applications 810, 812 and/or their corresponding UEs that the requested MBMS services have been received. Upon receiving an indication 824 that the application 808 is ready to receive the MBMS files/streams of the MBMS services corresponding to the MBMS service request 814, the middleware client 806 sends the requested MBMS files/streams 826 to the application 808. The middleware client 806 may also send the requested MBMS files/streams to the application 810 and the application 812. Subsequently, the middleware client 806 generates a reception report 828 that includes a reception acknowledgement and/or a statistical report. The reception report may include a client identifier associated with the second UE or the application 808 running on the second UE. The middleware client 806 sends the reception report 830 to the LTE modem 804, which sends the reception report 832 to the base station 802.

The middleware client 806 may be associated with an identifier of the first UE, such as for example, a mobile directory number (MDN) of the first UE. The MDN is a unique identifier of the first UE. Assume the second UE or the application 808 running on the second UE is associated with the identifier X, the application 810 or the corresponding UE is associated with the identifier Y, and the application 812 or the corresponding UE is associated with the identifier Z. As described supra, the first UE with the MDN receives a request for files/streams from UEs and/or applications running on UEs that are associated with the identifiers X, Y, and Z; attempts to receive the files/streams; provides the received files/streams to the applications running on the UEs associated with the identifiers X, Y, and Z; and sends one or more reception reports providing reception acknowledgements and/or statistical reports in association with the received files/streams. Within the one or more reception reports, rather than provide the client identifier MDN associated with the first UE, the first UE may provide client identifiers X, Y, and Z indicating the UEs or the applications running on the UEs that requested the files/streams and are the ultimate destination of the files/streams. In some configurations, within the one or more reception reports, the first UE provides both the MDN associated with the first UE and the client identifiers X, Y, and Z indicating the UEs or the applications running on the UEs that requested the files/streams and are the ultimate destination of the files/streams.

The middleware client 806 determines a type of reception report to generate based on a report type setting (e.g., reportType). If the report type is set to reception acknowledgement (RAck), only successful file reception is reported without reception details. If the report type is set to statistical reporting for successful reception (StaR), successful file reception is reported (as with RAck) with reception details for statistical analysis in the network. If the report type is set to statistical reporting for all content reception (StaR-all), the same as StaR is reported with the addition that failed reception is also reported. StaR-all is relevant to both streaming and download delivery. If the report type is set to statistical reporting without reception acknowledgement (StaR-only), the same as StaR-all is reported with the exception that individual files are not acknowledged. Only reception details are reported for the session for both streaming and download delivery. StaR-only is equivalent to StaR-all for streaming delivery. StaR-all is relevant to download delivery where session performance is obtained through quality of experience (QoE) metrics. When the report type is RAck, the client identifier (e.g., clientID attribute/element) may be stored under a fileURI attribute/element (see FIG. 30). When the report type is StaR, StaR-all, or StaR-only, the client identifier (e.g., clientID attribute/element) may be stored under a statisticalReport attribute/element (see FIG. 30). Alternatively, the client identifier may be stored under a different attribute/element than the clientID attribute/element (see FIG. 30).

Figure 9:
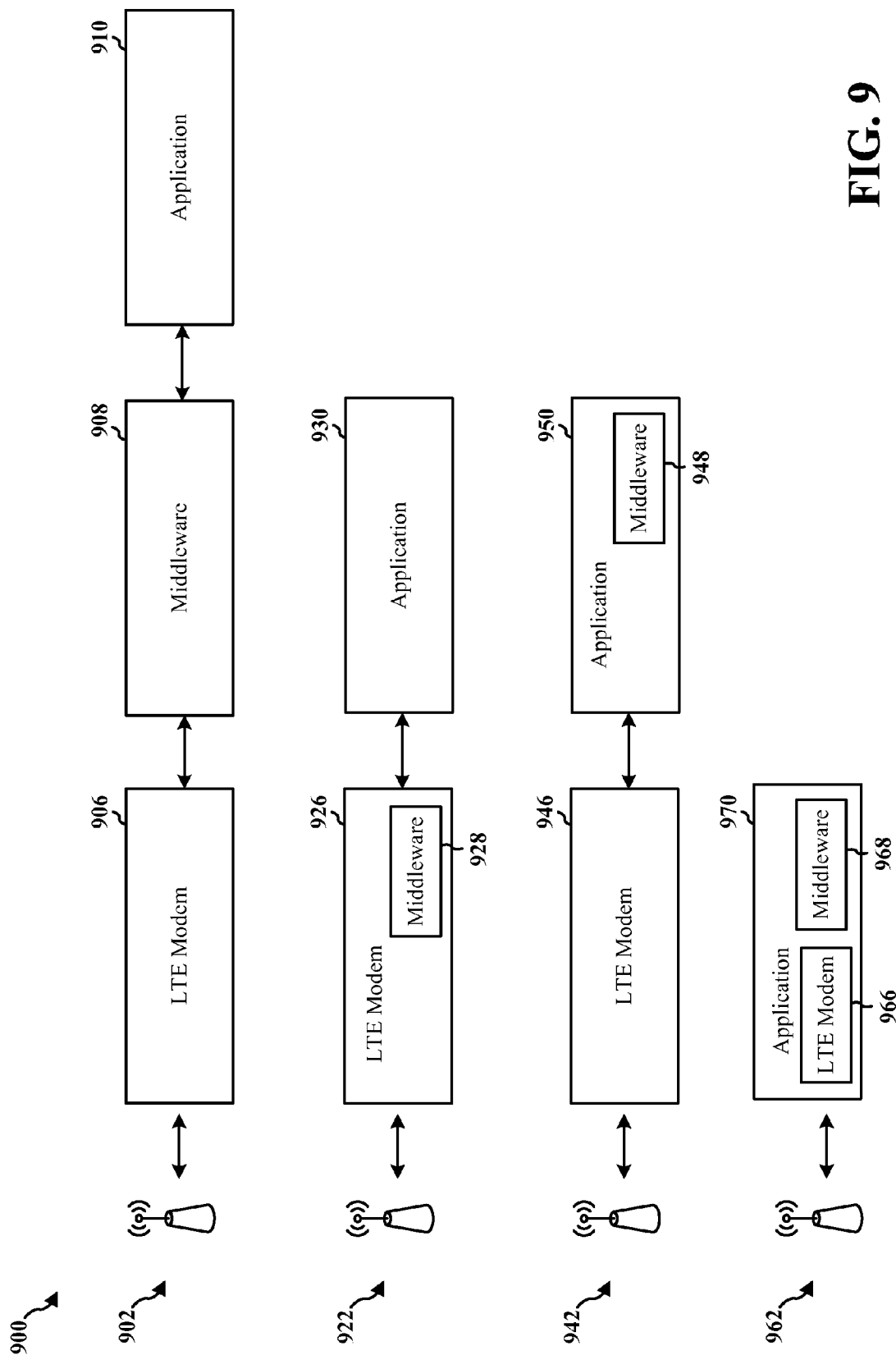
FIG. 9 is a diagram illustrating different exemplary eMBMS end-to-end architectures.

FIG. 9 is a diagram 900 illustrating different exemplary eMBMS end-to-end architectures. In a first configuration 902, the LTE modem 906, the middleware client 908, and the application 910 are associated with different UEs. In such a configuration, the middleware client 908 may run on a first UE, the application 910 may run on a second UE, and the LTE modem may be part of a third UE. In a second configuration 922, the middleware client 928 and the LTE modem 926 are associated with a first UE, and the application 930 is associated with a second UE. In such a configuration, the LTE modem 926 may be part of a first UE, the middleware client 928 may run on the first UE, and the application 930 may run on a second UE. In a third configuration 942, the middleware client 948 and the application 950 are associated with a first UE, and the LTE modem 946 is associated with a second UE. In such a configuration, the application 950 and the middleware client 948 run on a first UE, and the LTE modem 946 is part of a second UE. In a fourth configuration 962, the middleware client 968, the application 970, and the LTE modem 966 are all associated with the same UE. In such a configuration, the application 970 and the middleware client 968 run on a UE, and the LTE modem 966 is part of the UE. Accordingly, as can be seen by the first, second, third, and fourth configurations 902, 922, 942, 962, respectively, the middleware client 908 may be associated with a UE different from UEs associated with the LTE modem 906 and the application 910 (first configuration 902); the middleware client 928 may be associated with the same UE as the LTE modem 926, but not the UE on which the application 930 runs (second configuration 922); the middleware client 948 may be associated with the same UE as the application 950, but not the UE with the LTE modem 946 (third configuration 942); or the middleware client 968 may be associated with the UE that includes the LTE modem 966 and on which the application 970 runs (fourth configuration 962).

The middleware client may send one or more reception reports for requesting applications in which a client identifier associated with each received service is associated with one application only (referred to as parallel reporting), or may send one or more reception reports for requesting applications in which a client identifier associated with each received service is associated with one or more applications (referred to as linear reporting). For parallel reporting, a reception report may be sent for each application (referred to as parallel reporting without aggregation across applications) (note that in this case, multiple reports for one application may still be aggregated), or one reception report may be sent for all applications (referred to as parallel reporting with aggregation across applications). For linear reporting, a reception report may be sent for each service (referred to as linear reporting without aggregation across applications), or one reception report may be sent for all services (referred to as linear reporting with aggregation across applications). Parallel reporting is discussed infra with respect to FIGS. 10-16. Linear reporting is discussed infra with respect to FIGS. 17-24.

Figure 10:
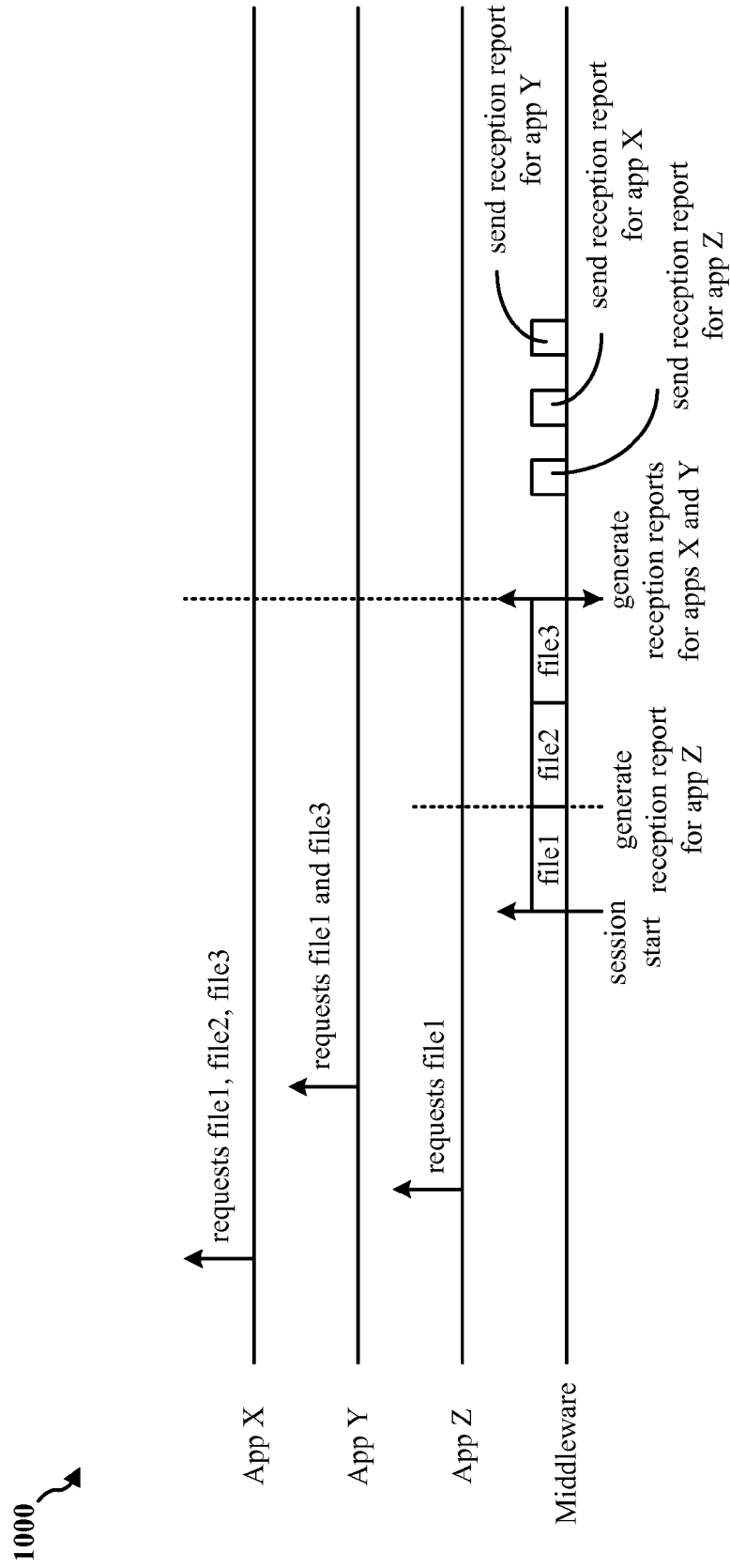
FIG. 10 is a diagram illustrating an example of parallel reporting (per application) without aggregation across applications for file delivery services.

FIG. 10 is a diagram 1000 illustrating an example of parallel reporting (per application) without aggregation across applications for file delivery services. As shown in FIG. 10, application X requests the middleware client to obtain file1, file2, and file3; application Y requests the middleware client to obtain file1 and file3; and application Z requests the middleware client to obtain file1. The middleware client, which is running on a first UE, starts an MBMS session with a base station (if the middleware client and LTE modem are both associated with the first UE (see configuration 922 of FIG. 9)) or a second UE (if the middleware client and LTE modem are associated with different UEs; here, the second UE is associated with the LTE modem (see configurations 902, 942 of FIG. 9)). The middleware client obtains the files file1, file2, and file3. Subsequent to obtaining file1, the middleware client generates a reception report for application Z. Subsequent to obtaining file2 and file3, the middleware client generates a reception report for application X and a reception report for application Y. Upon generating the reception reports, the middleware client sends the reception reports to the base station (if the middleware client and LTE modem are both associated with the first UE) or a second UE (if the middleware client and LTE modem are associated with different UEs; here, the second UE is associated with the LTE modem). If the middleware client sends the reception report to a second UE, the second UE forwards the reception report to a base station. The three reception reports are sent after backoff and randomization from each file end time as requested by the applications. For this example, the reception report may be RAck. Examples of the three reception reports are provided infra with respect to FIG. 11.

FIG. 11 is a diagram 1100 illustrating an example of reception reports sent for file delivery services when parallel reporting without aggregation across applications. The middleware client generates a first reception report to report reception of file1, file2, and file3 by the application X, a second reception report to report reception of file1 and file3 by the application Y, and a third reception report to report reception of file1 by the application Z. For the client identifier, the middleware client may report a client identifier that includes information associated with the middleware client and the application. For example, for the first reception report, the middleware client reports a client identifier "X@MDN," where X is an identifier of the application X, and the MDN is a unique identifier of the UE on which the middleware client is running. For the second reception report, the middleware client reports a client identifier "Y@MDN," where Y is an identifier of the application Y, and MDN is a unique identifier of the UE on which the middleware client is running. For the third reception report, the middleware client reports a client identifier "Z@MDN," where Z is an identifier of the application Z, and MDN is a unique identifier of the UE on which the middleware client is running. The middleware client may use a different separator between the identifiers than the "@" character. In some configurations, the MDN identifier may be omitted. Each of the identifiers of the applications X, Y, and Z may be an application specified identifier, a concatenation of an application specified identifier and a unique receiver identifier (e.g., an MDN, or an international mobile station equipment identity (IMEI)), or some other identifier that may be unique to the application. Such identifier may be stored under the fileURI attribute/element. As can be seen in FIG. 11, the same file is reported multiple times. For example, the file1 is reported in each of the three reception reports, and the file3 is reported in the first and second reception reports.

FIG. 12 is a diagram 1200 illustrating an example of a reception report sent for file delivery services when parallel reporting with aggregation across applications. The middleware client generates one aggregated reception report to report reception of file1, file2, and file3 by the application X, file1 and file3 by the application Y, and file1 by the application Z. For the client identifier, the middleware client may report a client identifier that includes information associated with the middleware client and the application, as discussed supra in relation to FIG. 11.

Figure 13:
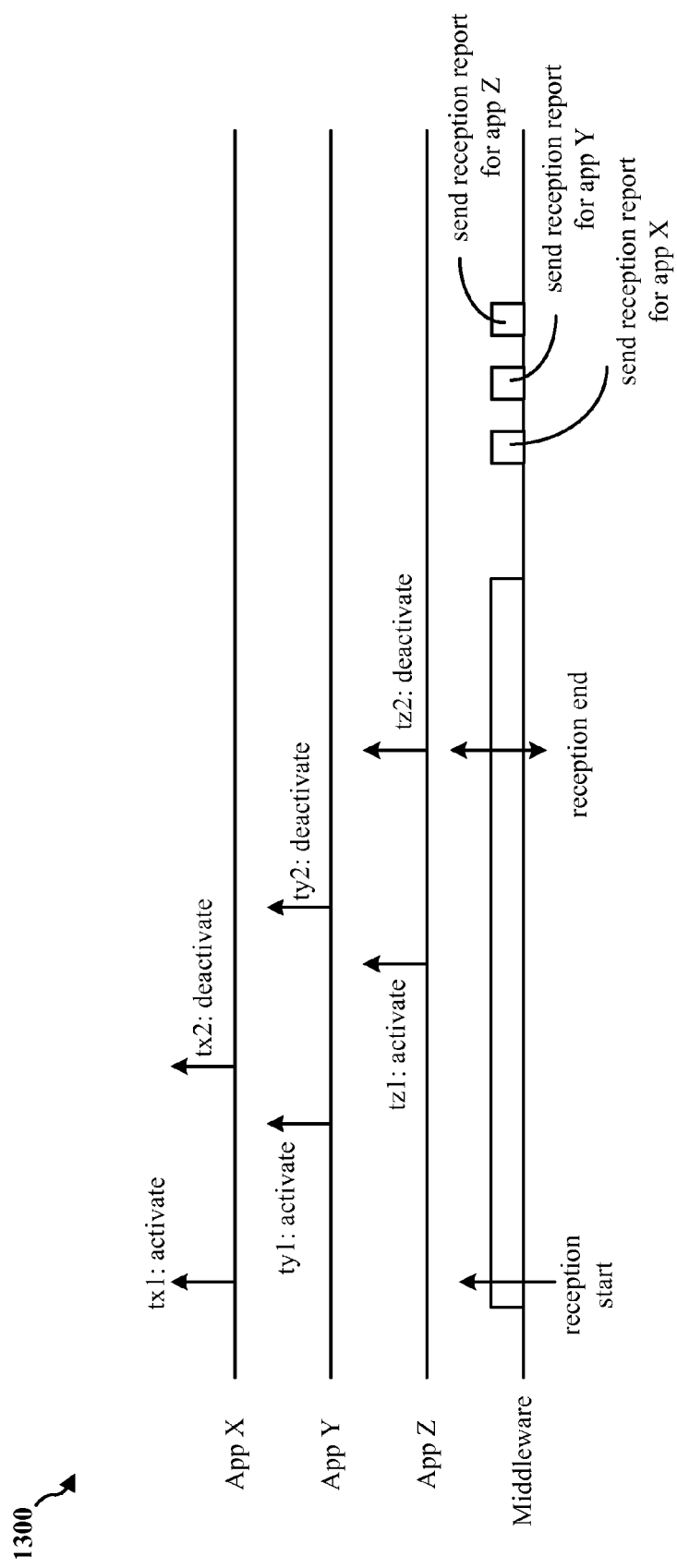
FIG. 13 is a diagram illustrating an example of parallel reporting (per application) without aggregation across applications for streaming services.

FIG. 13 is a diagram 1300 illustrating an example of parallel reporting (per application) without aggregation across applications for streaming services. As shown in FIG. 13, application X requests the middleware client to activate reception of a streaming service (e.g., a dynamic adaptive streaming over hypertext transfer protocol (HTTP) (DASH) streaming service) at tx1 and to deactivate reception of the streaming service at tx2, application Y requests the middleware client to activate reception of the same streaming service at ty1 and to deactivate reception of the streaming service at ty2, and application Z requests the middleware client to activate reception of the same streaming service at tz1 and to deactivate reception of the streaming service at tz2. The middleware client, which is running on a first UE, starts an MBMS session with a base station (if the middleware client and LTE modem are both associated with the first UE) or a second UE (if the middleware client and LTE modem are associated with different UEs; here, the second UE is associated with the LTE modem). The middleware client starts reception of the streaming service at tx1 and deactivates reception of the streaming service at tz2. Subsequent to receiving the streaming service, the middleware client generates a first reception report for application X, a second reception report for application Y, and a third reception report for application Z. Upon generating the reception reports, the middleware client sends the reception reports to the base station (if the middleware client and LTE modem are both associated with the first UE) or a second UE (if the middleware client and LTE modem are associated with different UEs; here, the second UE is associated with the LTE modem). If the middleware client sends the reception report to a second UE, the second UE forwards the reception report to a base station. The three reception reports are sent after backoff and randomization from the session end time. For this example, the reception report may be StaR, StaR-all, or StaR-only. In one configuration, for this example, the reception report may be StaR-only. Examples of the three reception reports are provided infra with respect to FIG. 14 and FIG. 15.

FIG. 14 and FIG. 15 are diagrams 1400 and 1500, respectively, illustrating an example of reception reports sent for streaming services when parallel reporting without aggregation across applications. The middleware client generates a first reception report to report reception of received objects by the application X, a second reception report to report reception of received objects by the application Y, and a third reception report to report reception of received objects by the application Z. For the client identifier, the middleware client may report a client identifier that includes information associated with the middleware client and the application. For example, for the first reception report, the middleware client reports a client identifier "X@MDN," where X is an identifier of the application X, and MDN is a unique identifier of the UE on which the middleware client is running. For the second reception report, the middleware client reports a client identifier "Y@MDN," where Y is an identifier of the application Y, and MDN is a unique identifier of the UE on which the middleware client is running. For the third reception report, the middleware client reports a client identifier "Z@MDN," where Z is an identifier of the application Z, and MDN is a unique identifier of the UE on which the middleware client is running. As discussed supra, the middleware client may use a different separator between the identifiers than the "@" character. In some configurations, the MDN identifier may be omitted. Each of the identifiers of the applications X, Y, and Z may be an application specified identifier, a concatenation of an application specified identifier and a unique receiver identifier (e.g., an MDN, or an IMEI), or some other identifier that may be unique to the application. Such identifier may be stored under the statistical report attribute/element. As can be seen in FIG. 14 and FIG. 15, the same objects are reported multiple times. For example, the objects 57 and 58 are reported in the first and second reception reports, and the object 55 is reported in the second and third reception reports.

FIG. 16 is a diagram 1600 illustrating an example of a reception report sent for streaming services when parallel reporting with aggregation across applications. The middleware client generates one aggregated reception report to report reception of objects 60 through 57 by the application X, objects 58 through 55 by application Y, and objects 55 through 52 by application Z. For the client identifier, the middleware client may report a client identifier that includes information associated with the middleware client and the application, as discussed supra in relation to FIG. 15.

Parallel reporting may be conceptually simple, but may require higher bandwidth usage, as the middleware client associates reports with applications. The middleware client may collect multiple reports simultaneously during the same MBMS session. Linear reporting, which is discussed infra with respect to FIGS. 17-24, requires less bandwidth usage than parallel reporting, as the middleware client may report a single report for each time period. The linear behavior mimics a receiver behavior. While with streaming services there can potentially be a larger number of reports, such reports can be aggregated easily.

FIG. 17 is a diagram 1700 illustrating an example of linear reporting (per application) with aggregation across applications for file delivery services. As shown in FIG. 17, application X requests the middleware client to obtain file1, file2, and file3; application Y requests the middleware client to obtain file1 and file3; and application Z requests the middleware client to obtain file1. The middleware client, which is running on a first UE, starts an MBMS session with a base station (if the middleware client and LTE modem are both associated with the first UE) or a second UE (if the middleware client and LTE modem are associated with different UEs; here, the second UE is associated with the LTE modem). The middleware client obtains the files file1, file2, and file3. Subsequent to obtaining file1, the middleware client generates one reception report for applications X, Y, and Z. Upon generating the reception report, the middleware client sends the reception report to the base station (if the middleware client and LTE modem are both associated with the first UE) or a second UE (if the middleware client and LTE modem are associated with different UEs; here, the second UE is associated with the LTE modem). If the middleware client sends the reception report to a second UE, the second UE forwards the reception report to a base station. The reception report is sent after backoff and randomization from the session end time. For this example, the reception report may be RAck. An example of the reception report is provided infra with respect to FIG. 18.

FIG. 18 is a diagram 1800 illustrating an example of a reception report sent for file delivery services when linear reporting with aggregation across applications. The middleware client generates one reception report to report reception of file1, file2, and file3 by the applications X, Y, and Z. Within the one reception report, the middleware client may report through a first client identifier that applications X, Y, and Z received file1; through a second client identifier that application X received file2; and through a third client identifier that applications X and Y received file3. Specifically, the middleware client may report through the client identifier "X@Y@Z@MDN" that applications X, Y, and Z received file1; through the client identifier "X@MDN" that application X received file2; and through the client identifier "X@Y@MDN" that the applications X and Y received file3. As discussed supra, X is an identifier of the application X, Y is an identifier of the application Y, Z is an identifier of the application Z, and MDN is a unique identifier of the UE on which the middleware client is running. The middleware client may use a different separator between the identifiers than the "@" character. In some configurations, the MDN identifier may be omitted. In some other configurations, the middleware client may be on a different UE than the modem; in this case, the MDN of the modem may also be provided, for example, X@MDN_middleware@MDN_modem. Each of the identifiers of the applications X, Y, and Z may be an application specified identifier, a concatenation of an application specified identifier and a unique receiver identifier (e.g., an MDN, or an IMEI), or some other identifier that may be unique to the application. Such identifier may be stored under the fileURI attribute/element. As can be seen in FIG. 18, each file is reported only once for the session.

Figure 19:
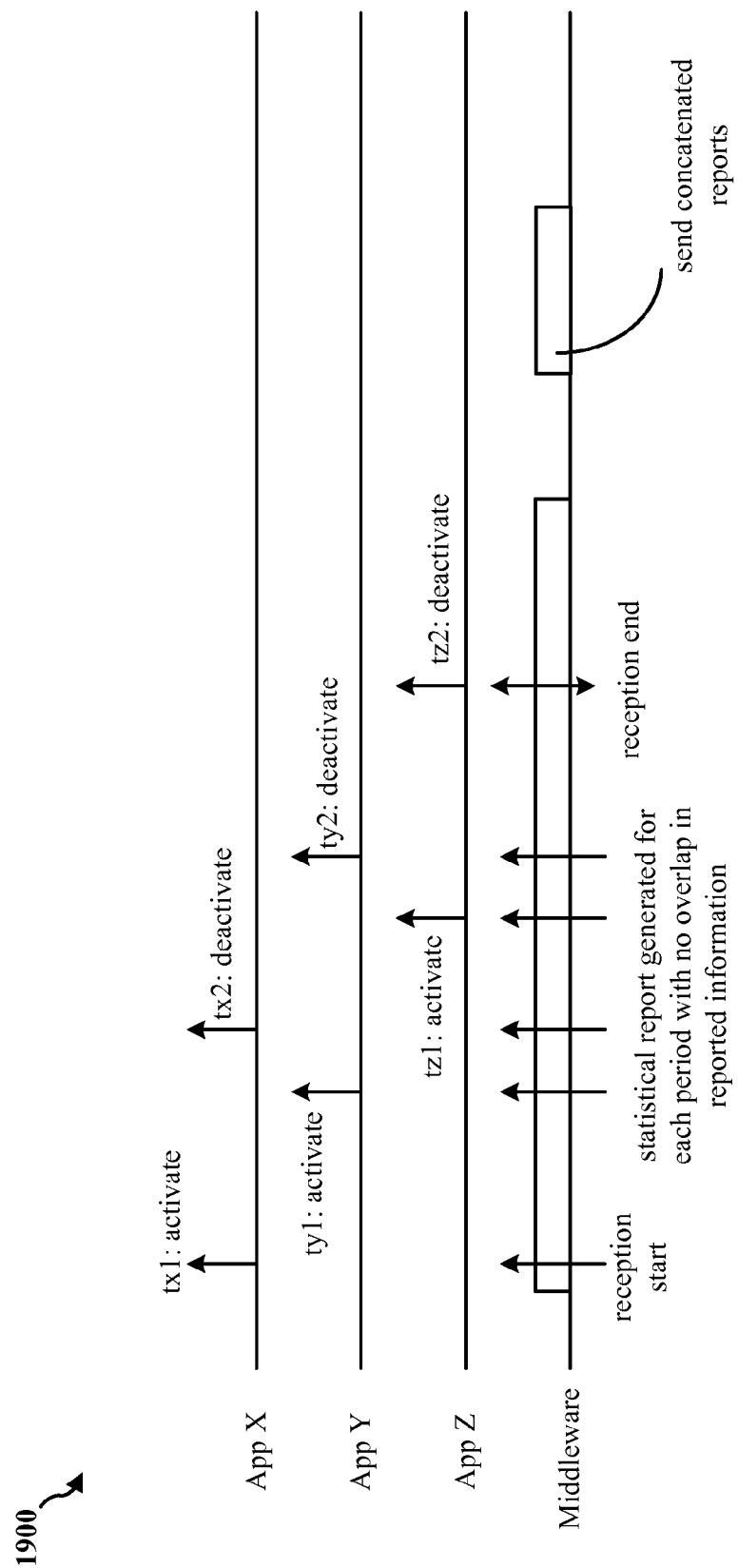
FIG. 19 is a diagram illustrating an example of linear reporting (per application) without aggregation across applications for streaming services.

FIG. 19 is a diagram 1900 illustrating an example of linear reporting (per application) without aggregation across applications for streaming services. As shown in FIG. 19, application X requests the middleware client to activate reception of a streaming service (e.g., a DASH streaming service) at tx1 and to deactivate reception of the streaming service at tx2, application Y requests the middleware client to activate reception of the same streaming service at ty1 and to deactivate reception of the streaming service at ty2, and application Z requests the middleware client to activate reception of the same streaming service at tz1 and to deactivate reception of the streaming service at tz2. The middleware client, which is running on a first UE, starts an MBMS session with a base station (if the middleware client and LTE modem are both associated with the first UE) or a second UE (if the middleware client and LTE modem are associated with different UEs; here, the second UE is associated with the LTE modem). The middleware client starts reception of the streaming service at tx1 and deactivates reception of the streaming service at tz2. Reporting sessions for generating reception reports start and end every time an application activates and deactivates a service. Accordingly, in this example, there are five reporting sessions, a first for tx1 to ty1, a second for ty1 to tx2, a third for tx2 to tz1, a fourth for tz1 to ty2, and a fifth for ty2 to tz2. Accordingly, while receiving the streaming service, the middleware client generates a first reception report for application X with respect to reception of the streaming service between tx1 and ty1, a second reception report for applications X and Y with respect to a reception of the streaming service between ty1 and tx2, a third reception report for application Y with respect to a reception of the streaming service between tx2 and tz1, a fourth reception report for applications Y and Z with respect to a reception of the streaming service between tz1 and ty2, and a fifth reception report for application Z with respect to a reception of the streaming service between ty2 and tz2. Upon generating the five reception reports, the middleware client may concatenate the reception reports together and send the concatenated reception reports to the base station (if the middleware client and LTE modem are both associated with the first UE) or a second UE (if the middleware client and LTE modem are associated with different UEs; here, the second UE is associated with the LTE modem). If the middleware client sends the concatenated reception report to a second UE, the second UE forwards the concatenated reception report to a base station. The concatenated reception report is sent after backoff and randomization from the session end time. For this example, the reception report may be StaR, StaR-all, or StaR-only. In one configuration, for this example, the reception report may be StaR-only. Examples of the five reception reports are provided infra with respect to FIG. 20, FIG. 21, and FIG. 22.

FIG. 20, FIG. 21, and FIG. 22 are diagrams 2000, 2100, and 2200, respectively, illustrating an example of reception reports sent for streaming services when linear reporting without aggregation across applications. The middleware client generates a first reception report to report reception of received objects 60 and 59 by the application X, a second reception report to report reception of received objects 58 and 57 by the applications X and Y, a third reception report to report reception of received object 56 by the application Y, a fourth reception report to report reception of received object 55 by the applications Y and Z, and a fifth reception report to report reception of received objects 54, 53, and 52 by the application Z. For the client identifier, the middleware client may report a client identifier that includes information associated with the middleware client and the applications that received the one or more objects. For example, for the first reception report, the middleware client reports a client identifier "X@MDN." For the second reception report, the middleware client reports a client identifier "X@Y@MDN." For the third reception report, the middleware client reports a client identifier "Y@MDN." For the fourth reception report, the middleware client reports a client identifier "Y@Z@MDN." For the fifth reception report, the middleware client reports a client identifier "Z@MDN." X is an identifier of the application X, Y is an identifier of the application Y, Z is an identifier of the application Z, and MDN is a unique identifier of the UE on which the middleware client is running. As discussed supra, the middleware client may use a different separator between the identifiers than the "@" character. In some configurations, the MDN identifier may be omitted. Each of the identifiers of the applications X, Y, and Z may be an application specified identifier, a concatenation of an application specified identifier and a unique receiver identifier (e.g., an MDN, or an IMEI), or some other identifier that may be unique to the application. Such identifier may be stored under the statistical report attribute/element. As can be seen in FIGS. 20-22, each object is reported only once.

FIG. 23 and FIG. 24 are diagrams 2300 and 2400, respectively, illustrating an example of a reception report sent for streaming services when linear reporting with aggregation across applications. The middleware client generates one aggregated reception report to report reception of objects 60 and 59 by the application X, objects 58 and 57 by the applications X and Y, object 56 by the application Y, object 55 by the applications Y and Z, and objects 54, 53, and 52 by the application Z. For the client identifier, the middleware client may report a client identifier that includes information associated with the middleware client and the applications that received the objects, as discussed supra in relation to FIGS. 20-22.

Figure 25:
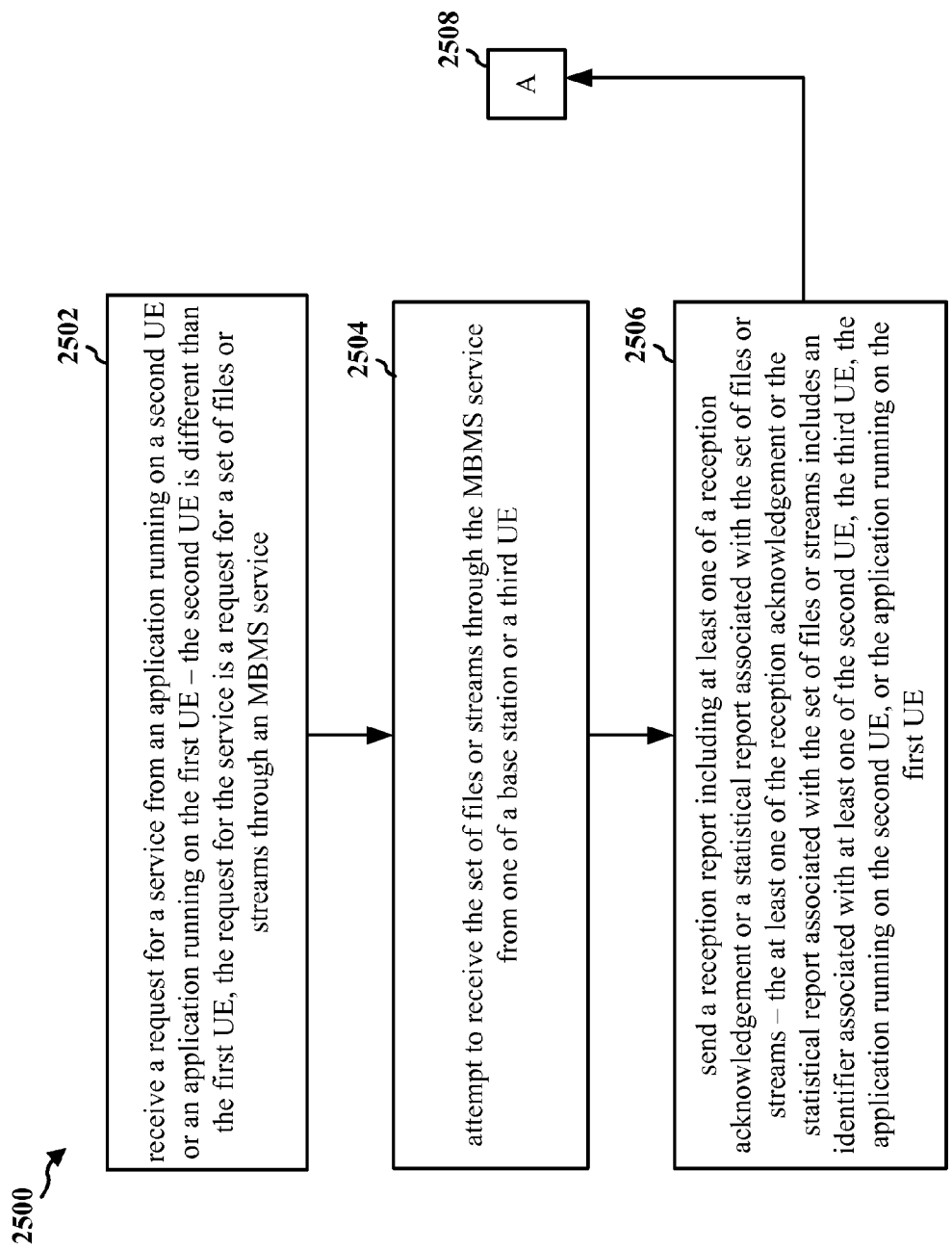
FIG. 25 is a flow chart of a first method of wireless communication.

FIG. 25 is a flow chart 2500 of a method of wireless communication. The method may be performed by a first UE. At 2502, the first UE receives a request for a service from an application running on a second UE or an application running on the first UE. The second UE is different than the first UE. The request for the service is a request for a set of files or streams through an MBMS service. For example, referring to the first configuration 902 of FIG. 9, the first UE with the middleware client 908 receives a request for a service from an application 910 running on a second UE. For another example, referring to the second configuration 922 of FIG. 9, the first UE with the middleware client 928 and LTE modem 926 receives a request for a service from an application 930 running on a second UE. For yet another example, referring to the third configuration 942 of FIG. 9, the first UE with the middleware client 948 and the application 950 receives a request for a service from the application 950 running on the first UE. For yet another example, referring to the fourth configuration 962 of FIG. 9, the first UE with the middleware client 968, the application 970, and the LTE modem 966 receives a request for a service from the application 970 running on the first UE.

At 2504, the first UE attempts to receive the set of files or streams through the MBMS service from one of a base station or a third UE. For example, referring to the second configuration 922 of FIG. 9, the first UE with the middleware client 928 and the LTE modem 926 attempts to receive the set of files or streams through the MBMS service from a base station. For another example, referring to the fourth configuration 962 of FIG. 9, the first UE with the middleware client 970, the LTE modem 966, and the application 970 attempts to receive the set of files or streams through the MBMS service from a base station. For another example, referring to the first configuration 902 of FIG. 9, the first UE with the middleware client 908 attempts to receive the set of files or streams through the MBMS service from a third UE with the LTE modem 906. For yet another example, referring to the third configuration 942 of FIG. 9, the first UE with the middleware client 948 and the application 950 attempts to receive the set of files or streams through the MBMS service from a third UE with the LTE modem 946.

At 2506, the first UE sends a reception report including at least one of a reception acknowledgement or a statistical report associated with the set of files or streams. The at least one of the reception acknowledgement or the statistical report associated with the set of files or streams includes an identifier associated with at least one of the second UE, the third UE, the application running on the second UE, or the application running on the first UE. In some scenarios, where the middleware is not co-located with the LTE modem (e.g., configurations 902, 942), then the report may also include an identifier associated with the third UE carrying the LTE modem. For example, referring to the first configuration 902 of FIG. 9, the first UE with the middleware client 908 sends, to the LTE modem 906, a reception report including at least one of a reception acknowledgement or a statistical report associated with the set of files or streams. The at least one of the reception acknowledgement or the statistical report associated with the set of files or streams includes an identifier associated with at least one of the third UE that includes the LTE modem 906, the application 910 running on the second UE, or the second UE on which the application 910 is running. For another example, referring to the second configuration 922 of FIG. 9, the first UE with the middleware client 928 and the LTE modem 926 sends, to a base station, a reception report including at least one of a reception acknowledgement or a statistical report associated with the set of files or streams. The at least one of the reception acknowledgement or the statistical report associated with the set of files or streams includes an identifier associated with the application 930 running on the second UE, or the second UE on which the application 930 is running. For yet another example, referring to the third configuration 942 of FIG. 9, the first UE with the middleware client 948 and the application 950 sends, to the LTE modem 946, a reception report including at least one of a reception acknowledgement or a statistical report associated with the set of files or streams. The at least one of the reception acknowledgement or the statistical report associated with the set of files or streams includes an identifier associated with at least one of the third UE that includes the LTE modem 946 or the application 950 running on the first UE.

In the above examples, the identifier associated with at least one of the second UE, the third UE, the application running on the second UE, or the application running on the first UE may be X. As such, the client identifier may be set to X. In one configuration, the client identifier may include an identifier (e.g., MDN) of the first UE. In such a configuration, the client identifier may be set to "X@MDN," as discussed supra. After 2506, in some configurations, 2508 may be performed with respect to FIG. 26, FIG. 27, FIG. 28, or FIG. 29.

In one configuration, the at least one of the reception acknowledgement or the statistical report associated with the set of files or streams includes an identifier associated with the first UE, where the identifier associated with the first UE is different from the identifier associated with the application running on the first UE. For example, referring to the first configuration 902 of FIG. 9, the identifier may include an MDN of first UE on which the middleware client 908 is running. The identifier may further include an identifier of the application 910, or an identifier of the UE on which the application 910 is running. For another example, referring to the second configuration 922 of FIG. 9, the identifier may include an MDN of the first UE on which the middleware client 928 is running. The identifier may further include an identifier of the application 930, or an identifier of the UE on which the application 930 is running. For yet another example, referring to the third configuration 942 of FIG. 9, the identifier may include an MDN of the first UE on which the middleware client 948 is running. The identifier may further include an identifier of the application 950.

In one configuration, the identifier associated with the application running on the first UE is one identifier of a plurality of identifiers associated with different applications running on the first UE. In one configuration, the identifier associated with the first UE and the identifier associated with at least one of the second UE, the third UE, the application running on the second UE, or the application running on the first UE are indicated in a client identifier attribute/element (e.g., clientID attribute/element within fileURI attribute/element or within statisticalReport attribute/element; see FIG. 30) within the at least one of the reception acknowledgement or the statistical report. In one configuration, the identifier associated with the first UE is indicated in a client identifier attribute/element (e.g., clientID attribute/element) within the at least one of the reception acknowledgement or the statistical report, and the identifier associated with at least one of the second UE, the third UE, the application running on the second UE, or the application running on the first UE is indicated in a different attribute/element (e.g., an attribute/element different than the clientID attribute/element) within the at least one of the reception acknowledgement or the statistical report. Specifically, a different attribute/element may be introduced within the reception acknowledgement and statistical report elements that indicate the UEs or the applications running on the UEs that requested the files/streams and are the ultimate destination of the files/streams. In one configuration, the identifier is associated with at least one of the second UE or an application running on the second UE (see, e.g., the first and second configurations 902, 922 of FIG. 9). In one configuration, the identifier is associated with the application running on the first UE (see, e.g., the third configuration 942 of FIG. 9).

Figure 26:
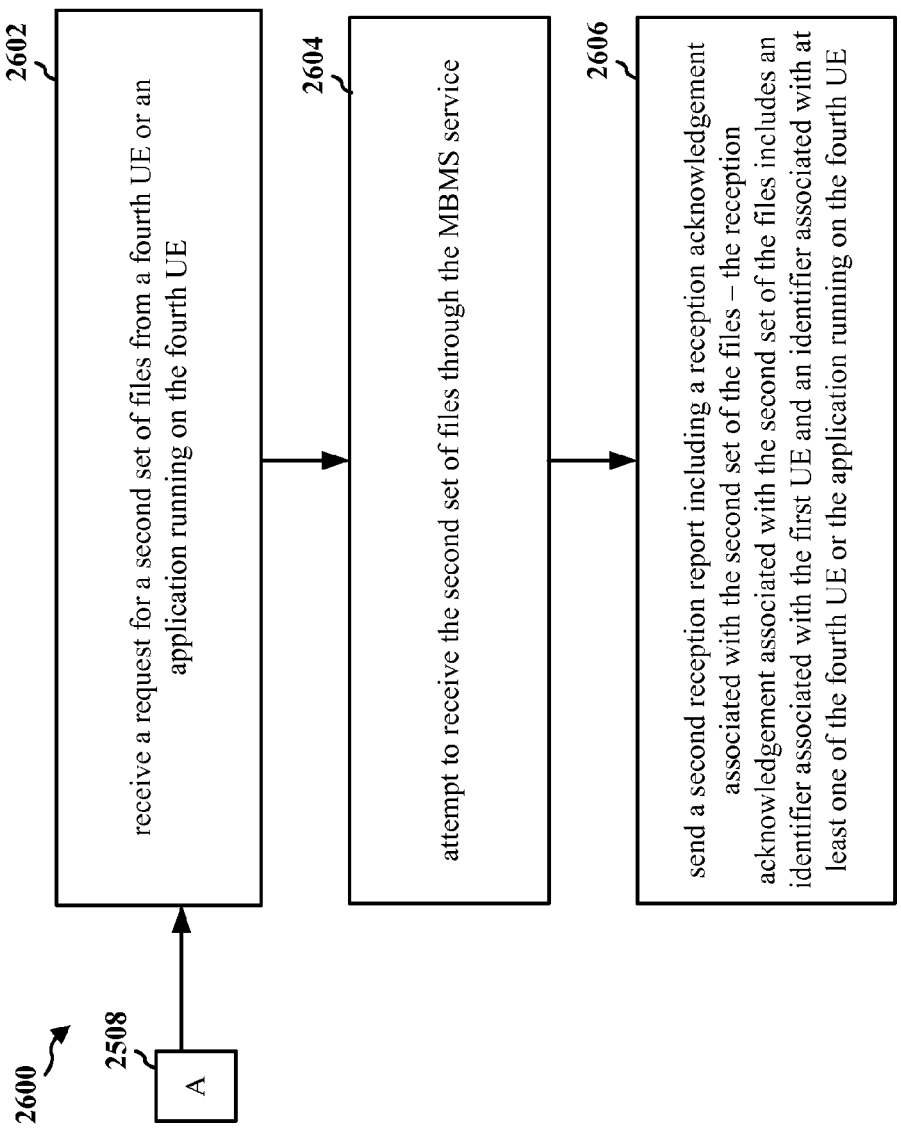
FIG. 26 is a flow chart of a second method of wireless communication.

FIG. 26 is a flow chart 2600 of a method of wireless communication. The method may be performed by a first UE. At 2502, 2504, and 2506 of FIG. 25, the set of files or streams is a set of files, and the reception report includes the reception acknowledgement (RAck) associated with the set of files. Step 2508 continues from FIG. 25 and leads to 2602. At 2602, the first UE receives a request for a second set of files from a fourth UE or an application running on the fourth UE. At 2604, the first UE attempts to receive the second set of files through the MBMS service. At 2606, the first UE sends a second reception report including a reception acknowledgement associated with the second set of the files. The reception acknowledgement associated with the second set of the files includes an identifier (e.g., MDN) associated with the first UE and an identifier associated with at least one of the fourth UE or the application running on the fourth UE. For example, if an identifier associated with at least one of the fourth UE or the application running on the fourth UE is Y, the client identifier may be set to "Y@MDN," as discussed supra. In one configuration, the reception report and the second reception report are aggregated into one report (e.g., see FIG. 12, FIG. 18).

FIG. 27 is a flow chart 2700 of a method of wireless communication. The method may be performed by a first UE. Step 2508 continues from FIG. 25 and leads to 2702. At 2702, the first UE receives a request for a second set of files from a fourth UE or an application running on the fourth UE. The reception acknowledgement is further associated with the second set of files. The set of files is $S_1$ and the second set of files is $S_2$. For a set of files $S_1 \cap S_2$ ($\cap$ is the intersection of the sets), the reception acknowledgment includes a sub-element acknowledging reception of the files $S_1 \cap S_2$, an identifier (e.g., MDN) associated with the first UE, and identifiers associated with at least one of both the second UE and the fourth UE or applications running on both the second UE and the fourth UE (e.g., X may be an identifier of the second UE or an application running on the second UE, and Y may be an identifier of the fourth UE or an application running on the fourth UE). For example, the three identifiers are within the clientID "X@Y@MDN." For a set of files $S_1$ excluding the subset of files $S_1 \cap S_2$, the reception acknowledgment includes a subelement acknowledging reception of the files $S_1$ excluding the subset of files $S_1 \cap S_2$, an identifier (e.g., MDN) associated with the first UE, and an identifier (e.g., X) associated with at least one of the second UE or an application running on the second UE. For example, the two identifiers are within the clientID "X@MDN." For a set of files $S_2$ excluding the subset of files $S_1 \cap S_2$, the reception acknowledgment includes a subelement acknowledging reception of the files $S_2$ excluding the subset of files $S_1 \cap S_2$, an identifier (e.g., MDN) associated with the first UE, and an identifier (e.g., Y) associated with at least one of the fourth UE or an application running on the fourth UE. For example, the two identifiers are within the clientID "Y@MDN."

Figure 28:
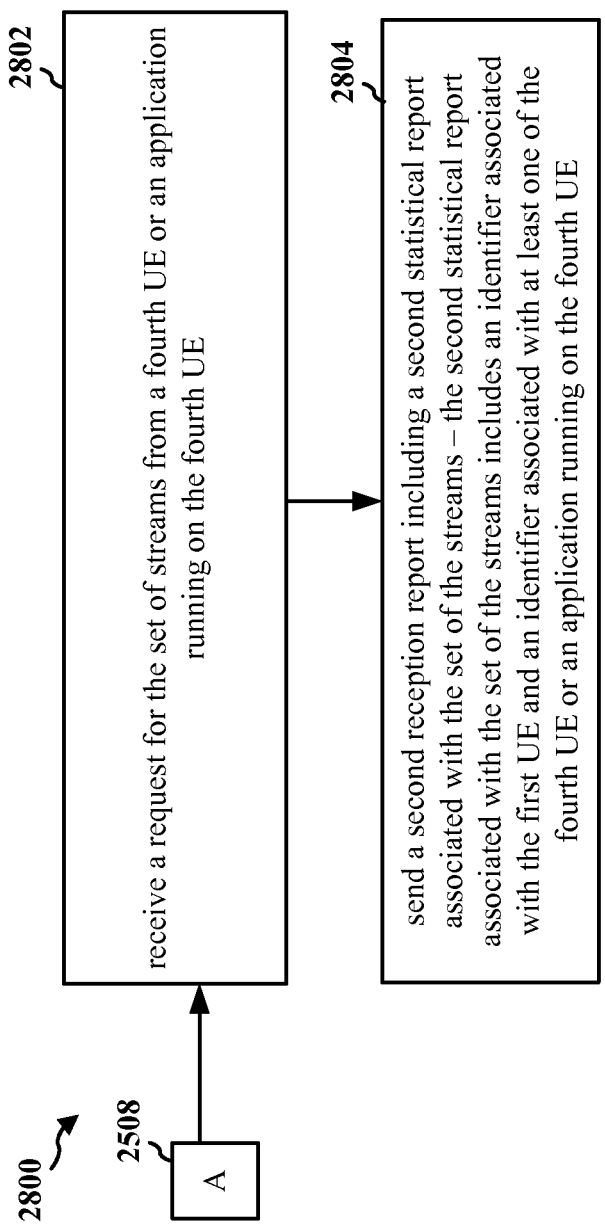
FIG. 28 is a flow chart of a fourth method of wireless communication.

FIG. 28 is a flow chart 2800 of a method of wireless communication. The method may be performed by a first UE. At 2502, 2504, and 2506 of FIG. 25, the set of files or streams is a set of streams, and the reception report includes the statistical report (e.g., StaR, StaR-all, StaR-only) associated with the set of the streams. Step 2508 continues from FIG. 25 and leads to 2802. At 2802, the first UE receives a request for the set of streams from a fourth UE or an application running on the fourth UE. At 2804, the first UE sends a second reception report including a second statistical report associated with the set of the streams. The second statistical report associated with the set of the streams includes an identifier (e.g., MDN) associated with the first UE and an identifier (e.g., Y) associated with at least one of the fourth UE or an application running on the fourth UE. For example, if an identifier associated with at least one of the fourth UE or the application running on the fourth UE is Y, the client identifier may be set to "Y@MDN," as discussed supra. In one configuration, the reception report and the second reception report are aggregated into one report (e.g., see FIG. 16, FIG. 23, FIG. 24).

Figure 29:
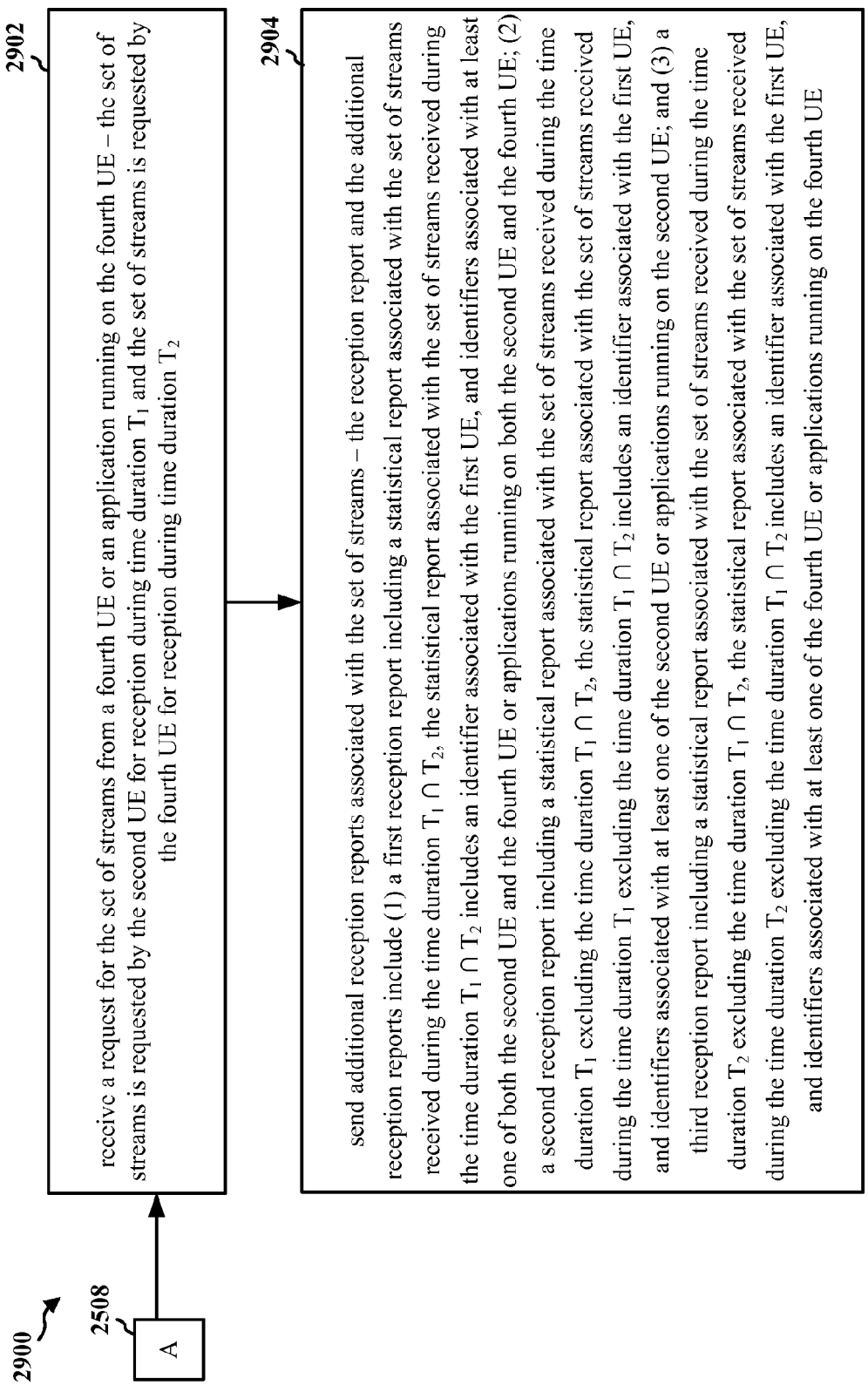
FIG. 29 is a flow chart of a fifth method of wireless communication.

FIG. 29 is a flow chart 2900 of a method of wireless communication. The method may be performed by a first UE. Step 2508 continues from FIG. 25 and leads to 2902. At 2902, the first UE receives a request for the set of streams from a fourth UE or an application running on the fourth UE. The set of streams is requested by the second UE for reception during time duration $T_1$ and the set of streams is requested by the fourth UE for reception during time duration $T_2$. For example, referring to FIG. 19, the time duration $T_1$ may be the time duration between tx1 and tx2, and the time duration $T_2$ may be the time duration between ty1 and ty2. At 2904, the first UE sends additional reception reports associated with the set of streams.

The reception report and the additional reception reports include a first reception report including a statistical report associated with the set of streams received during the time duration $T_1 \cap T_2$ (e.g., the time duration between ty1 and tx2). The statistical report associated with the set of streams received during the time duration $T_1 \cap T_2$ includes an identifier (e.g., MDN) associated with the first UE, and identifiers associated with at least one of both the second UE and the fourth UE or applications running on both the second UE and the fourth UE (e.g., X may be an identifier of the second UE or an application running on the second UE, and Y may be an identifier of the fourth UE or an application running on the fourth UE). For example, the three identifiers are within the clientID "X@Y@MDN."

The reception report and the additional reception reports further include a second reception report including a statistical report associated with the set of streams received during the time duration $T_1$ excluding the time duration $T_1 \cap T_2$ (e.g., the time duration between tx1 and ty1). The statistical report associated with the set of streams received during the time duration $T_1$ excluding the time duration $T_1 \cap T_2$ includes an identifier (e.g., MDN) associated with the first UE, and an identifier (e.g., X) associated with at least one of the second UE or applications running on the second UE. For example, the two identifiers are within the clientID "X@MDN."

The reception report and the additional reception reports further include a third reception report including a statistical report associated with the set of streams received during the time duration $T_2$ excluding the time duration $T_1 \cap T_2$ (e.g., the time duration between tx2 and ty2). The statistical report associated with the set of streams received during the time duration $T_2$ excluding the time duration $T_1 \cap T_2$ include an identifier associated with the first UE, and an identifier (e.g., Y) associated with at least one of the fourth UE or applications running on the fourth UE. For example, the two identifiers are within the clientID "Y@MDN."

Figure 30:
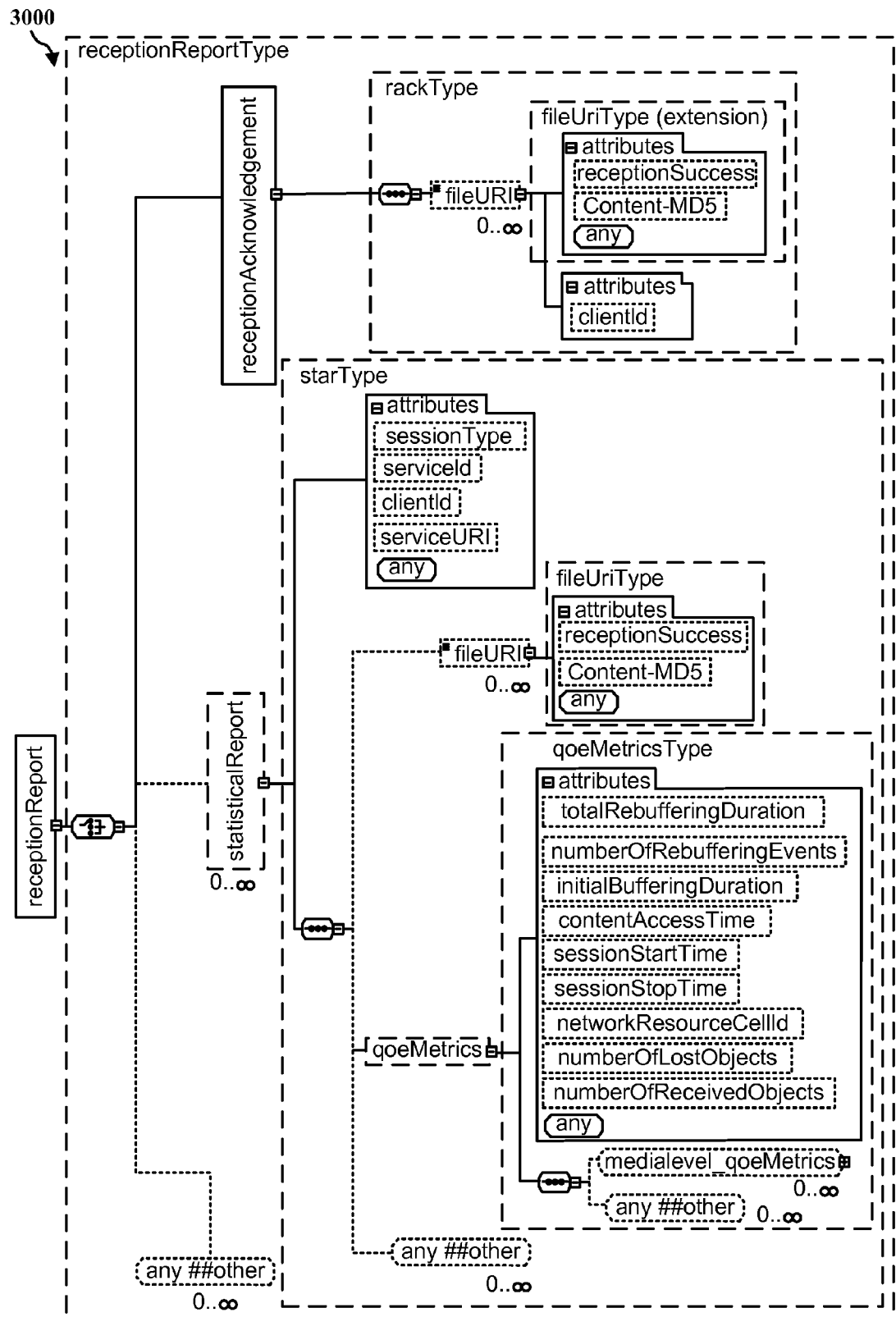
FIG. 30 is a diagram illustrating the clientID attribute/element within a reception report.

FIG. 30 is a diagram illustrating the clientID attribute/element within a reception report. The aforementioned client identifier may be added in the clientID attribute/element under fileURI or under statistical report, or may be added under an attribute/element different than the client ID element attribute.

Figure 31:
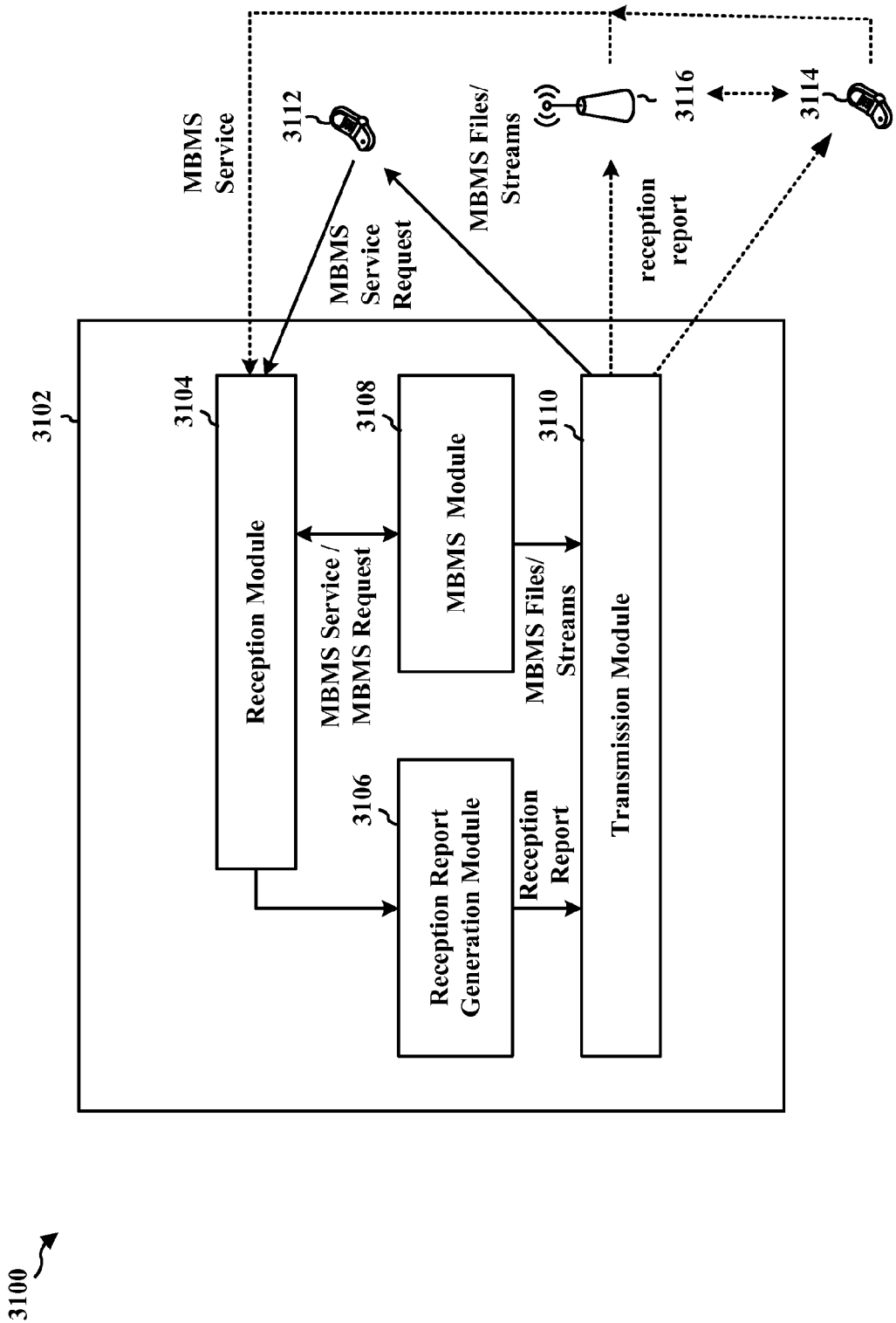
FIG. 31 is a conceptual data flow diagram illustrating the data flow between different modules/means/components in an exemplary apparatus.

FIG. 31 is a conceptual data flow diagram 3100 illustrating the data flow between different modules/means/components in an exemplary apparatus 3102. The apparatus may be a first UE. The first UE 3102 includes a reception module 3104 that is configured to receive a request for a service from an application running on a second UE 3112 (see configurations 902, 922 of FIG. 9) or an application running on the first UE 3102 (see configurations 942, 962 of FIG. 9). The second UE 3112 is different than the first UE 3102. The request for the service is a request for a set of files or streams through an MBMS service. The reception module 3104 is configured to provide the MBMS request to an MBMS module 3108. The reception module 3104 is configured to attempt to receive the set of files or streams through the MBMS service from one of a base station 3116 (see configurations 922, 962 of FIG. 9) or a third UE 3114 (see configurations 902, 942 of FIG. 9). The reception module 3104 is configured to provide any received files/streams to the MBMS module 3108. The MBMS module 3108 is configured to provide received files/streams to a transmission module 3110. The transmission module 3110 is configured to provide such received files/streams to the UE that requested the files/streams (i.e., the second UE 3112 for configurations 902, 922 of FIG. 9; the first UE 3102 for configuration 942 of FIG. 9). The first UE 3102 further includes a reception report generation module 3106 that is configured to generate reception reports and to provide such generated reception reports to the transmission module 3110. The transmission module 3110 is configured to send a reception report including at least one of a reception acknowledgement or a statistical report associated with the set of files or streams. The at least one of the reception acknowledgement or the statistical report associated with the set of files or streams includes an identifier associated with at least one of the second UE 3112, the third UE 3114, the application running on the second UE 3112, or the application running on the first UE 3102.

In one configuration, the at least one of the reception acknowledgement or the statistical report associated with the set of files or streams includes an identifier associated with the first UE. The identifier associated with the first UE is different from the identifier associated with the application running on the first UE. In one configuration, the identifier associated with the application running on the first UE is one identifier of a plurality of identifiers associated with different applications running on the first UE. In one configuration, the identifier associated with the first UE and the identifier associated with at least one of the second UE, the third UE, the application running on the second UE, or the application running on the first UE are indicated in a client identifier attribute within the at least one of the reception acknowledgement or the statistical report. In one configuration, the identifier associated with the first UE is indicated in a client identifier attribute within the at least one of the reception acknowledgement or the statistical report, and the identifier associated with at least one of the second UE, the third UE, the application running on the second UE, or the application running on the first UE is indicated in a different attribute within the at least one of the reception acknowledgement or the statistical report. In one configuration, the identifier is associated with at least one of the second UE or an application running on the second UE. In one configuration, the identifier is associated with the application running on the first UE.

In one configuration, the set of files or streams is a set of files, and the reception report includes the reception acknowledgement associated with the set of files. In such a configuration, the reception module 3104 is configured to receive a request for a second set of files from a fourth UE or an application running on the fourth UE. The reception module 3104 is further configured to attempt to receive the second set of files through the MBMS service. The transmission module 3110 is further configured to send a second reception report including a reception acknowledgement associated with the second set of the files. The reception acknowledgement associated with the second set of the files includes an identifier associated with the first UE and an identifier associated with at least one of the fourth UE or the application running on the fourth UE. In one configuration, the reception report and the second reception report are aggregated into one report.

In one configuration, the reception module 3104 is configured to receive a request for a second set of files from a fourth UE or an application running on the fourth UE. The reception acknowledgement is further associated with the second set of files. The set of files is $S_1$ and the second set of files is $S_2$. For a set of files $S_1 \cap S_2$, the reception acknowledgment includes a subelement acknowledging reception of the files $S_1 \cap S_2$, an identifier associated with the first UE, and identifiers associated with at least one of both the second UE and the fourth UE or applications running on both the second UE and the fourth UE. For a set of files $S_1$ excluding the subset of files $S_1 \cap S_2$, the reception acknowledgment includes a subelement acknowledging reception of the files $S_1$ excluding the subset of files $S_1 \cap S_2$, an identifier associated with the first UE, and an identifier associated with at least one of the second UE or an application running on the second UE. For a set of files $S_2$ excluding the subset of files $S_1 \cap S_2$, the reception acknowledgment includes a subelement acknowledging reception of the files $S_2$ excluding the subset of files $S_1 \cap S_2$, an identifier associated with the first UE, and an identifier associated with at least one of the fourth UE or an application running on the fourth UE.

In one configuration, the set of files or streams is a set of streams, and the reception report includes the statistical report associated with the set of the streams. In one configuration, the reception module 3104 is further configured to receive a request for the set of streams from a fourth UE or an application running on the fourth UE. The transmission module 3110 is further configured to send a second reception report including a second statistical report associated with the set of the streams. The second statistical report associated with the set of the streams includes an identifier associated with the first UE and an identifier associated with at least one of the fourth UE or an application running on the fourth UE. In one configuration, the reception report and the second reception report are aggregated into one report.

In one configuration, the reception module 3104 is further configured to receive a request for the set of streams from a fourth UE or an application running on the fourth UE. The set of streams is requested by the second UE for reception during time duration $T_1$ and the set of streams is requested by the fourth UE for reception during time duration $T_2$. The transmission module is further configured to send additional reception reports associated with the set of streams. The reception report and the additional reception reports include a first reception report including a statistical report associated with the set of streams received during the time duration $T_1 \cap T_2$. The statistical report associated with the set of streams received during the time duration $T_1 \cap T_2$ includes an identifier associated with the first UE, and identifiers associated with at least one of both the second UE and the fourth UE or applications running on both the second UE and the fourth UE. The reception report and the additional reception reports further include a second reception report including a statistical report associated with the set of streams received during the time duration $T_1$ excluding the time duration $T_1 \cap T_2$. The statistical report associated with the set of streams received during the time duration $T_1$ excluding the time duration $T_1 \cap T_2$ includes an identifier associated with the first UE, and an identifier associated with at least one of the second UE or applications running on the second UE. The reception report and the additional reception reports further include a third reception report including a statistical report associated with the set of streams received during the time duration $T_2$ excluding the time duration $T_1 \cap T_2$. The statistical report associated with the set of streams received during the time duration $T_2$ excluding the time duration $T_1 \cap T_2$ includes an identifier associated with the first UE, and an identifier associated with at least one of the fourth UE or applications running on the fourth UE.

The apparatus may include additional modules that perform each of the blocks of the algorithm in the aforementioned flow charts of FIGS. 25-29. As such, each block in the aforementioned flow charts of FIGS. 25-29 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 32:
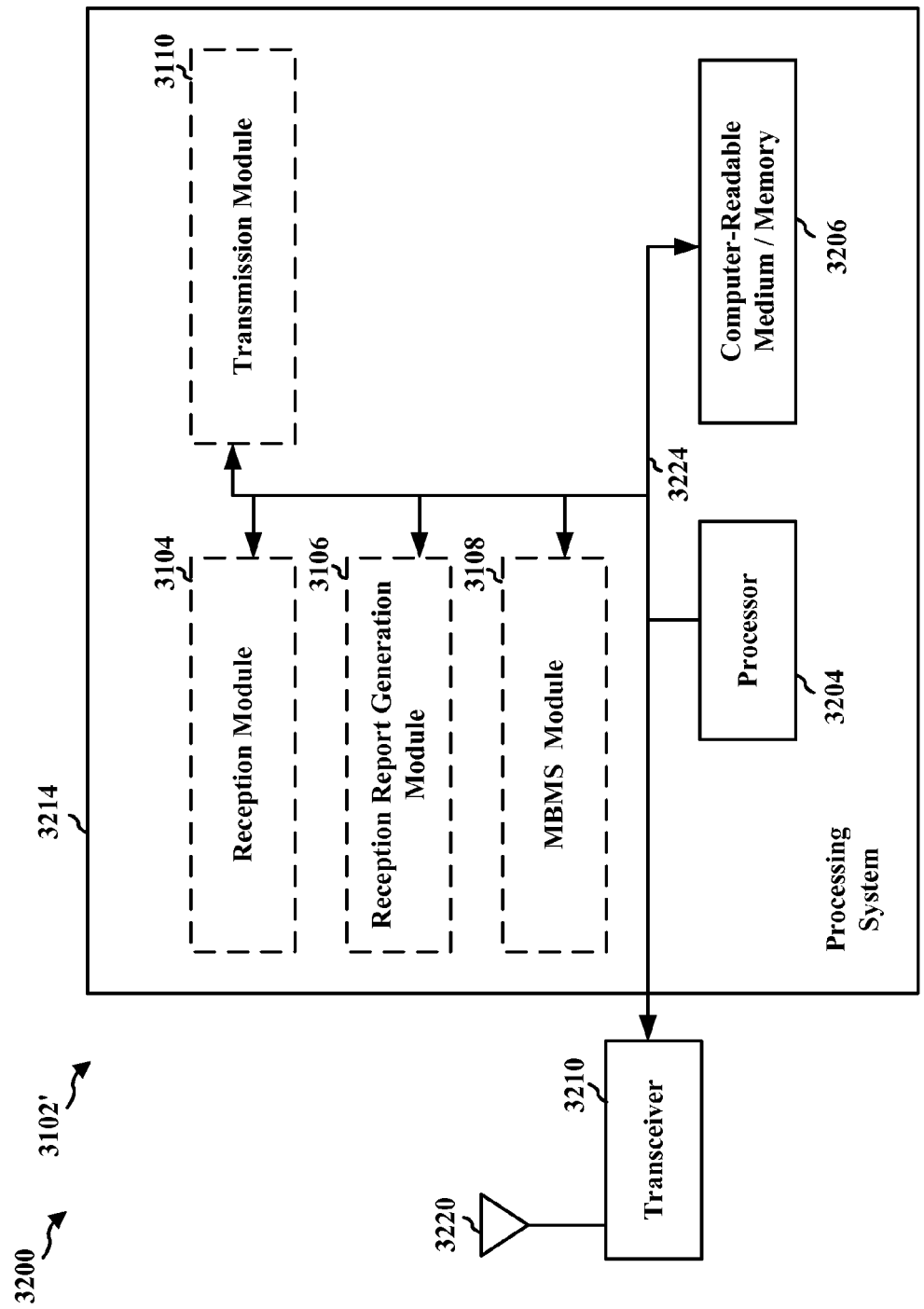
FIG. 32 is a diagram illustrating an example of a hardware implementation for an apparatus employing a processing system.

FIG. 32 is a diagram 3200 illustrating an example of a hardware implementation for an apparatus 3102' employing a processing system 3214. The processing system 3214 may be implemented with a bus architecture, represented generally by the bus 3224. The bus 3224 may include any number of interconnecting buses and bridges depending on the specific application of the processing system 3214 and the overall design constraints. The bus 3224 links together various circuits including one or more processors and/or hardware modules, represented by the processor 3204, the modules 3104, 3106, 3108, 3110, and the computer-readable medium/memory 3206. The bus 3224 may also link various other circuits such as timing sources, peripherals, voltage regulators, and power management circuits, which are well known in the art, and therefore, will not be described any further.

The processing system 3214 may be coupled to a transceiver 3210. The transceiver 3210 is coupled to one or more antennas 3220. The transceiver 3210 provides a means for communicating with various other apparatus over a transmission medium. The transceiver 3210 receives a signal from the one or more antennas 3220, extracts information from the received signal, and provides the extracted information to the processing system 3214, specifically the reception module 3104. In addition, the transceiver 3210 receives information from the processing system 3214, specifically the transmission module 3110, and based on the received information, generates a signal to be applied to the one or more antennas 3220. The processing system 3214 includes a processor 3204 coupled to a computer-readable medium/memory 3206. The processor 3204 is responsible for general processing, including the execution of software stored on the computer-readable medium/memory 3206. The software, when executed by the processor 3204, causes the processing system 3214 to perform the various functions described supra for any particular apparatus. The computer-readable medium/memory 3206 may also be used for storing data that is manipulated by the processor 3204 when executing software. The processing system further includes at least one of the modules 3104, 3106, 3108, and 3110. The modules may be software modules running in the processor 3204, resident/stored in the computer readable medium/memory 3206, one or more hardware modules coupled to the processor 3204, or some combination thereof. The processing system 3214 may be a component of the UE 650 and may include the memory 660 and/or at least one of the TX processor 668, the RX processor 656, and the controller/processor 659.

In one configuration, the apparatus 3102/3102' for wireless communication may be a first UE. The first UE includes means for receiving a request for a service from an application running on a second UE or an application running on the first UE. The second UE is different than the first UE. The request for the service is a request for a set of files or streams through an MBMS service. The first UE further includes means for attempting to receive the set of files or streams through the MBMS service from one of a base station or a third UE. The first UE further includes means for sending a reception report including at least one of a reception acknowledgement or a statistical report associated with the set of files or streams. The at least one of the reception acknowledgement or the statistical report associated with the set of files or streams includes an identifier associated with at least one of the second UE, the third UE, the application running on the second UE, or the application running on the first UE.

In one configuration, the set of files or streams is a set of files, and the reception report includes the reception acknowledgement associated with the set of files. In such a configuration, the first UE may further include means for receiving a request for a second set of files from a fourth UE or an application running on the fourth UE, means for attempting to receive the second set of files through the MBMS service, and means for sending a second reception report including a reception acknowledgement associated with the second set of the files. The reception acknowledgement associated with the second set of the files includes an identifier associated with the first UE and an identifier associated with at least one of the fourth UE or the application running on the fourth UE. In such a configuration, the first UE may further include means for receiving a request for a second set of files from a fourth UE or an application running on the fourth UE. The reception acknowledgement is further associated with the second set of files. The set of files is $S_1$ and the second set of files is $S_2$. For a set of files $S_1 \cap S_2$, the reception acknowledgment includes a subelement acknowledging reception of the files $S_1 \cap S_2$, an identifier associated with the first UE, and identifiers associated with at least one of both the second UE and the fourth UE or applications running on both the second UE and the fourth UE. For a set of files $S_1$ excluding the subset of files $S_1 \cap S_2$, the reception acknowledgment includes a subelement acknowledging reception of the files $S_1$ excluding the subset of files $S_1 \cap S_2$, an identifier associated with the first UE, and an identifier associated with at least one of the second UE or an application running on the second UE. For a set of files $S_2$ excluding the subset of files $S_1 \cap S_2$, the reception acknowledgment includes a subelement acknowledging reception of the files $S_2$ excluding the subset of files $S_1 \cap S_2$, an identifier associated with the first UE, and an identifier associated with at least one of the fourth UE or an application running on the fourth UE.

In one configuration, the set of files or streams is a set of streams, and the reception report includes the statistical report associated with the set of the streams. In such a configuration, the first UE may further include means for receiving a request for the set of streams from a fourth UE or an application running on the fourth UE, and means for sending a second reception report including a second statistical report associated with the set of the streams. The second statistical report associated with the set of the streams includes an identifier associated with the first UE and an identifier associated with at least one of the fourth UE or an application running on the fourth UE. In such a configuration, the first UE may further include means for receiving a request for the set of streams from a fourth UE or an application running on the fourth UE. The set of streams is requested by the second UE for reception during time duration $T_1$ and the set of streams is requested by the fourth UE for reception during time duration $T_2$. The first UE may further include means for sending additional reception reports associated with the set of streams.

The reception report and the additional reception reports include a first reception report including a statistical report associated with the set of streams received during the time duration $T_1 \cap T_2$. The statistical report associated with the set of streams received during the time duration $T_1 \cap T_2$ includes an identifier associated with the first UE, and identifiers associated with at least one of both the second UE and the fourth UE or applications running on both the second UE and the fourth UE.

The reception report and the additional reception reports further include a second reception report including a statistical report associated with the set of streams received during the time duration $T_1$ excluding the time duration $T_1 \cap T_2$. The statistical report associated with the set of streams received during the time duration $T_1$ excluding the time duration $T_1 \cap T_2$ includes an identifier associated with the first UE, and an identifier associated with at least one of the second UE or applications running on the second UE.

The reception report and the additional reception reports further include a third reception report including a statistical report associated with the set of streams received during the time duration $T_2$ excluding the time duration $T_1 \cap T_2$. The statistical report associated with the set of streams received during the time duration $T_2$ excluding the time duration $T_1 \cap T_2$ includes an identifier associated with the first UE, and an identifier associated with at least one of the fourth UE or applications running on the fourth UE.

The aforementioned means may be one or more of the aforementioned modules of the apparatus 3102 and/or the processing system 3214 of the apparatus 3102' configured to perform the functions recited by the aforementioned means. As described supra, the processing system 3214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a first user equipment (UE), comprising:
   receiving, by the first UE, a request for a service from an application running on a second UE or an application running on the first UE, the second UE being different than the first UE, the request for the service being a request for a set of files or streams through a Multimedia Broadcast Multicast Service (MBMS) service;
   attempting, by the first UE, to receive the set of files or streams through the MBMS service from one of a base station or a third UE; and
   sending, by the first UE, a reception report including at least one of a reception acknowledgement or a statistical report associated with the set of files or streams, the at least one of the reception acknowledgement or the statistical report associated with the set of files or streams including an identifier of at least one of the second UE, the third UE, the application running on the second UE, or the application running on the first UE.

2. The method of claim 1, wherein the at least one of the reception acknowledgement or the statistical report associated with the set of files or streams includes an identifier of the first UE, the identifier of the first UE being different from the identifier of the application running on the first UE.

3. The method of claim 2, wherein the identifier of the application running on the first UE is one identifier of a plurality of identifiers associated with different applications running on the first UE.

4. The method of claim 3, wherein the identifier of the first UE and the identifier of at least one of the second UE, the third UE, the application running on the second UE, or the application running on the first UE are indicated in a client identifier attribute within the at least one of the reception acknowledgement or the statistical report.

5. The method of claim 3, wherein the identifier of the first UE is indicated in a client identifier attribute within the at least one of the reception acknowledgement or the statistical report, and the identifier of at least one of the second UE, the third UE, the application running on the second UE, or the application running on the first UE is indicated in a different attribute within the at least one of the reception acknowledgement or the statistical report.

6. The method of claim 1, wherein the identifier is associated with at least one of the second UE or an application running on the second UE.

7. The method of claim 1, wherein the identifier is associated with the application running on the first UE.

8. The method of claim 1, wherein the set of files or streams comprises a set of files, and the reception report includes the reception acknowledgement associated with the set of files.

9. The method of claim 8, further comprising:
   receiving a request for a second set of files from a fourth UE or an application running on the fourth UE;
   attempting to receive the second set of files through the MBMS service; and
   sending a second reception report including a reception acknowledgement associated with the second set of the files, the reception acknowledgement associated with the second set of the files including an identifier associated with the first UE and an identifier associated with at least one of the fourth UE or the application running on the fourth UE.

10. The method of claim 9, wherein the reception report and the second reception report are aggregated into one report.

11. The method of claim 8, further comprising receiving a request for a second set of files from a fourth UE or an application running on the fourth UE, wherein the reception acknowledgement is further associated with the second set of files, the set of files being $S_1$ and the second set of files being $S_2$, wherein:
   for a set of files $S_1 \cap S_2$, the reception acknowledgment includes a subelement acknowledging reception of the files $S_1 \cap S_2$, an identifier associated with the first UE, and identifiers associated with at least one of both the second UE and the fourth UE or applications running on both the second UE and the fourth UE;
   for a set of files $S_1$ excluding the subset of files $S_1 \cap S_2$, the reception acknowledgment includes a subelement acknowledging reception of the files $S_1$ excluding the subset of files $S_1 \cap S_2$, an identifier associated with the first UE, and an identifier associated with at least one of the second UE or an application running on the second UE; and for a set of files $S_2$ excluding the subset of files $S_1 \cap S_2$, the reception acknowledgment includes a subelement acknowledging reception of the files $S_2$ excluding the subset of files $S_1 \cap S_2$, an identifier associated with the first UE, and an identifier associated with at least one of the fourth UE or an application running on the fourth UE.

12. The method of claim 1, wherein the set of files or streams comprises a set of streams, and the reception report includes the statistical report associated with the set of the streams.

13. The method of claim 12, further comprising:
receiving a request for the set of streams from a fourth UE or an application running on the fourth UE; and
sending a second reception report including a second statistical report associated with the set of the streams, the second statistical report associated with the set of the streams including an identifier associated with the first UE and an identifier associated with at least one of the fourth UE or an application running on the fourth UE.

14. The method of claim 13, wherein the reception report and the second reception report are aggregated into one report.

15. The method of claim 12, further comprising:
receiving a request for the set of streams from a fourth UE or an application running on the fourth UE, the set of streams being requested by the second UE for reception during time duration $T_1$ and the set of streams being requested by the fourth UE for reception during time duration $T_2$; and
sending additional reception reports associated with the set of streams,
wherein the reception report and the additional reception reports include:
a first reception report including a statistical report associated with the set of streams received during the time duration $T_1 \cap T_2$, the statistical report associated with the set of streams received during the time duration $T_1 \cap T_2$ including an identifier associated with the first UE, and identifiers associated with at least one of both the second UE and the fourth UE or applications running on both the second UE and the fourth UE;
a second reception report including a statistical report associated with the set of streams received during the time duration $T_1$ excluding the time duration $T_1 \cap T_2$, the statistical report associated with the set of streams received during the time duration $T_1$ excluding the time duration $T_1 \cap T_2$ including an identifier associated with the first UE, and an identifier associated with at least one of the second UE or applications running on the second UE; and
a third reception report including a statistical report associated with the set of streams received during the time duration $T_2$ excluding the time duration $T_1 \cap T_2$, the statistical report associated with the set of streams received during the time duration $T_2$ excluding the time duration $T_1 \cap T_2$ including an identifier associated with the first UE, and an identifier associated with at least one of the fourth UE or applications running on the fourth UE.

16. An apparatus for wireless communication, the apparatus being a first user equipment (UE), comprising:
means for receiving a request for a service from an application running on a second UE or an application running on the first UE, the second UE being different than the first UE, the request for the service being a request for a set of files or streams through a Multimedia Broadcast Multicast Service (MBMS) service;
means for attempting to receive the set of files or streams through the MBMS service from one of a base station or a third UE; and
means for sending a reception report including at least one of a reception acknowledgement or a statistical report associated with the set of files or streams, the at least one of the reception acknowledgement or the statistical report associated with the set of files or streams including an identifier of at least one of the second UE, the third UE, the application running on the second UE, or the application running on the first UE.

17. The apparatus of claim 16, wherein the at least one of the reception acknowledgement or the statistical report associated with the set of files or streams includes an identifier of the first UE, the identifier of the first UE being different from the identifier of the application running on the first UE.

18. The apparatus of claim 17, wherein the identifier of the application running on the first UE is one identifier of a plurality of identifiers associated with different applications running on the first UE.

19. The apparatus of claim 16, wherein the set of files or streams comprises a set of files, and the reception report includes the reception acknowledgement associated with the set of files.

20. The apparatus of claim 19, further comprising:
means for receiving a request for a second set of files from a fourth UE or an application running on the fourth UE;
means for attempting to receive the second set of files through the MBMS service; and
means for sending a second reception report including a reception acknowledgement associated with the second set of the files, the reception acknowledgement associated with the second set of the files including an identifier associated with the first UE and an identifier associated with at least one of the fourth UE or the application running on the fourth UE.

21. The apparatus of claim 16, wherein the set of files or streams comprises a set of streams, and the reception report includes the statistical report associated with the set of the streams.

22. The apparatus of claim 21, further comprising:
means for receiving a request for the set of streams from a fourth UE or an application running on the fourth UE; and
means for sending a second reception report including a second statistical report associated with the set of the streams, the second statistical report associated with the set of the streams including an identifier associated with the first UE and an identifier associated with at least one of the fourth UE or an application running on the fourth UE.

23. An apparatus for wireless communication, the apparatus being a first user equipment (UE), comprising:
a memory; and
at least one processor coupled to the memory and configured to:
receive a request for a service from an application running on a second UE or an application running on the first UE, the second UE being different than the first UE, the request for the service being a request for a set of files or streams through a Multimedia Broadcast Multicast Service (MBMS) service;

attempt to receive the set of files or streams through the MBMS service from one of a base station or a third UE; and send a reception report including at least one of a reception acknowledgement or a statistical report associated with the set of files or streams, the at least one of the reception acknowledgement or the statistical report associated with the set of files or streams including an identifier of at least one of the second UE, the third UE, the application running on the second UE, or the application running on the first UE.

24. The apparatus of claim 23, wherein the at least one of the reception acknowledgement or the statistical report associated with the set of files or streams includes an identifier of the first UE, the identifier associated with the first UE being different from the identifier of the application running on the first UE.

25. The apparatus of claim 24, wherein the identifier of the application running on the first UE is one identifier of a plurality of identifiers associated with different applications running on the first UE.

26. The apparatus of claim 23, wherein the set of files or streams comprises a set of files, and the reception report includes the reception acknowledgement associated with the set of files.

27. The apparatus of claim 26, wherein the at least one processor is further configured to:
receive a request for a second set of files from a fourth UE or an application running on the fourth UE;
attempt to receive the second set of files through the MBMS service; and
send a second reception report including a reception acknowledgement associated with the second set of the files, the reception acknowledgement associated with the second set of the files including an identifier associated with the first UE and an identifier associated with at least one of the fourth UE or the application running on the fourth UE.

28. The apparatus of claim 23, wherein the set of files or streams comprises a set of streams, and the reception report includes the statistical report associated with the set of the streams.

29. The apparatus of claim 28, wherein the at least one processor is further configured to:
receive a request for the set of streams from a fourth UE or an application running on the fourth UE; and
send a second reception report including a second statistical report associated with the set of the streams, the second statistical report associated with the set of the streams including an identifier associated with the first UE and an identifier associated with at least one of the fourth UE or an application running on the fourth UE.

30. A non-transitory computer-readable medium storing computer executable code for wireless communication, comprising code for:
receiving a request for a service from an application running on a second user equipment (UE) or an application running on a first UE, the second UE being different than the first UE, the request for the service being a request for a set of files or streams through a Multimedia Broadcast Multicast Service (MBMS) service;
attempting to receive the set of files or streams through the MBMS service from one of a base station or a third UE; and
sending a reception report including at least one of a reception acknowledgement or a statistical report associated with the set of files or streams, the at least one of the reception acknowledgement or the statistical report associated with the set of files or streams including an identifier of at least one of the second UE, the third UE, the application running on the second UE, or the application running on the first UE.

* * * * *